United States Patent
Yamane et al.

(10) Patent No.: US 12,540,892 B2
(45) Date of Patent: Feb. 3, 2026

(54) INFORMATION PROCESSING DEVICE, INFORMATION PROCESSING METHOD, PROGRAM, AND INFORMATION PROCESSING SYSTEM

(71) Applicant: Sony Group Corporation, Tokyo (JP)

(72) Inventors: Kenji Yamane, Tokyo (JP); Junichiro Enoki, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 895 days.

(21) Appl. No.: 17/636,013

(22) PCT Filed: Jul. 13, 2020

(86) PCT No.: PCT/JP2020/027196
§ 371 (c)(1),
(2) Date: Feb. 16, 2022

(87) PCT Pub. No.: WO2021/039158
PCT Pub. Date: Mar. 4, 2021

(65) Prior Publication Data
US 2022/0283073 A1 Sep. 8, 2022

(30) Foreign Application Priority Data

Aug. 23, 2019 (JP) .................................. 2019152593
May 29, 2020 (JP) ................................. 2020-093877

(51) Int. Cl.
*G01N 15/1429* (2024.01)
(52) U.S. Cl.
CPC ............................... *G01N 15/1429* (2013.01)
(58) Field of Classification Search
CPC .............. G01N 33/52; G01N 15/1429; G01N 2015/1006; G06V 20/69; G06V 10/58;
(Continued)

(56) References Cited

U.S. PATENT DOCUMENTS 5,703,959 A 12/1997 Asano et al.
7,853,432 B2 * 12/2010 Hero, III ........... G06F 18/21375
702/181

(Continued)

FOREIGN PATENT DOCUMENTS

CN 103049581 A 4/2013
CN 106548205 A 3/2017
(Continued)

OTHER PUBLICATIONS

International Written Opinion and English translation thereof mailed Sep. 29, 2020 in connection with International Application No. PCT/JP2020/027196.

(Continued)

*Primary Examiner* — John H Le
(74) *Attorney, Agent, or Firm* — Wolf, Greenfield & Sacks, P.C.

(57) ABSTRACT

Data increased by multicoloring is analyzed. An information processing device according to an embodiment includes: a dimensional compression unit (214) that executes dimensional compression on each of a plurality of pieces of spectral data including a fluorescent component emitted from each of a plurality of particles labeled with one or more fluorescent dyes; an initial value determination unit (214) that determines an initial value for each of a plurality of nodes on the basis of a result of the dimensional compression; and a clustering unit (214) that executes clustering on the plurality of pieces of spectral data using the initial value.

19 Claims, 16 Drawing Sheets

(58) Field of Classification Search
CPC ...... G06V 10/60; G06V 2201/03; G06N 3/04; G06N 3/088; G06F 18/10; G06F 18/231
USPC .......................................................... 702/27
See application file for complete search history.

(56) References Cited

U.S. PATENT DOCUMENTS

| | | | |
|---|---|---|---|
| 9,934,364 | B1 | 4/2018 | Kumar |
| 2009/0097733 | A1 | 4/2009 | Hero et al. |
| 2013/0266959 | A1 | 10/2013 | Kaiser et al. |
| 2017/0371886 | A1 | 12/2017 | Chen et al. |

FOREIGN PATENT DOCUMENTS

| | | | | |
|---|---|---|---|---|
| CN | 107239791 | A | 10/2017 | |
| JP | H06-3252 | A | 1/1994 | |
| JP | 2007-132921 | A | 5/2007 | |
| JP | 2016-511397 | A | 4/2016 | |
| WO | WO-2009046185 | A2 * | 4/2009 | ......... G01N 15/1459 |
| WO | WO-2011154258 | A1 | 12/2011 | |

OTHER PUBLICATIONS

International Preliminary Report on Patentability and English translation thereof mailed Mar. 3, 2022 in connection with International Application No. PCT/JP2020/027196.

Extended European Search Report issued May 26, 2023 in connection with European Application No. 17806771.6.

Akash Dubey: "The Mathematics Behind Principal Component Analysis Towards Data Science", Dec. 20, 2018 (Dec. 20, 2018), XP93047502, retrieved on May 16, 2023] * Section Mathematics Behind PCA *.

Van Gassen Sofie et al: "FlowSOM: Using Self-Organizing Maps for Visualization and Interpretation of Cytometry Data", Cytometry A, Jan. 8, 2015 (Jan. 8, 2015), vol. 87, No. 7, pp. 636-645, XP055794113, Hoboken, USA ISSN: 1552-4922, DOI:10.1002/cyto.a.22625.

International Search Report and English translation thereof mailed Sep. 29, 2020 in connection with International Application No. PCT/JP2020/027196.

[No Author Listed], Linear vs. Logarithmic Scaling. FlowJo University. Nov. 12, 2018. https://www.bdj.co.jp/biosciences/support/flowjo-university/contents/start/linear_logarithmic.html and https://www.flowjo.com/learn/flowjo-university/flowjo/before-flowjo/59 (non-official translation, last accessed Feb. 14, 2022), 9 pages.

Ye et al., Ultrafast clustering of single-cell flow cytometry data using FlowGrid. BMC Syst Biol. Apr. 5, 2019;13(Suppl 2):35. doi: 10.1186/s12918-019-0690-2.

Anonymous: "Dimensionality Reduction—Google Search", Jul. 22, 2024 (Jul. 22, 2024), XP093188330.

Di-Yuan Tzeng et al: "A review of principal component analysis and its applications to color technology", Color Research & Application, John Wiley & Sons, Inc, Jan. 28, 2005, pp. 84-98, vol. 30, No. 2, XP071624742.

Deng Xuran et al., "Overview of clustering center initial value selection method", Chinese Journal of Electronic Science Research, Apr. 30, 2019, pp. 354-359, vol. 14, No. 4.

Enrico Lugli, et al., "Subject Classification Obtained by Cluster Analysis and Principal Component Analysis Applied to Flow Cytometric Data", Cytometry Part A, Mar. 12, 2007, pp. 334-344, vol. 17A, No. 5.

Lenhardt et al., Artificial neural networks for processing fluorescence spectroscopy data in skin cancer diagnostics. Physica Scripta. Nov. 15, 2013;2013(T157):014057. 4 pages.

* cited by examiner

| PARAMETER ID | W | T | M | A |
|---|---|---|---|---|
| 1 | 1 | 100 | 2000 | 10 |
| 2 | 1 | 10 | 1000 | 10 |
| 3 | 1 | 1 | 1 | 1 |

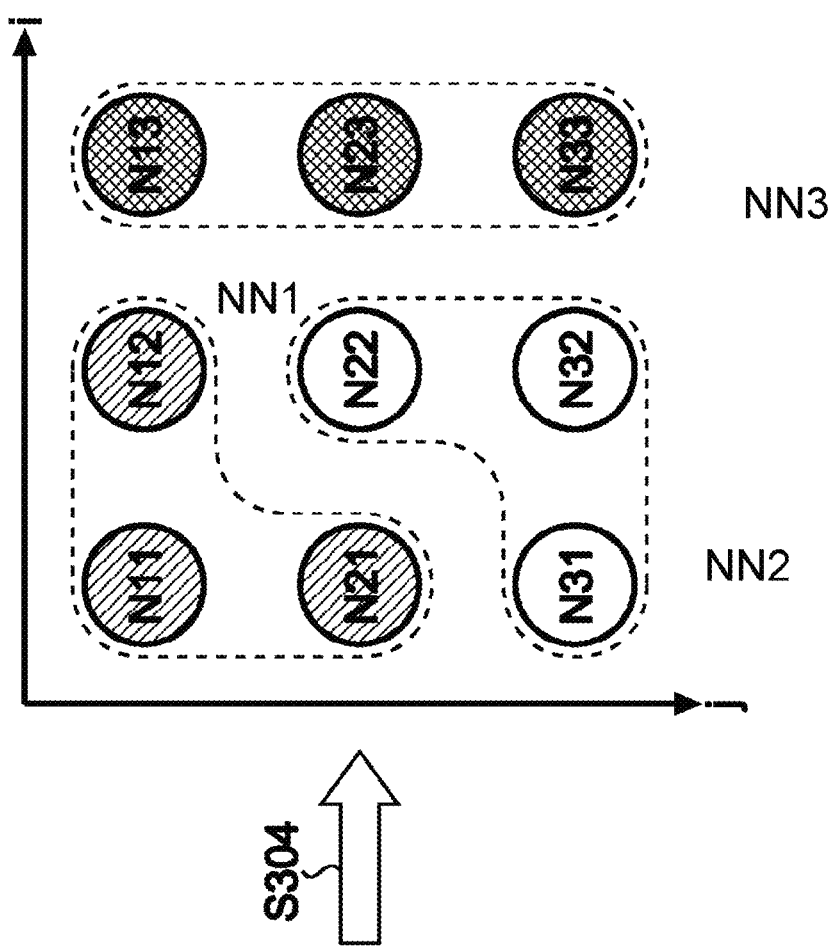
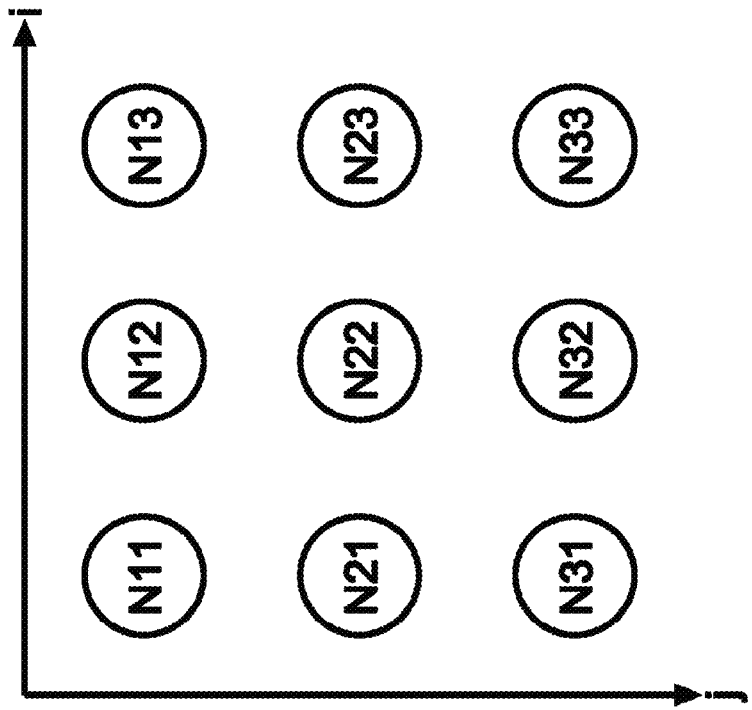
FIG.17

INFORMATION PROCESSING DEVICE, INFORMATION PROCESSING METHOD, PROGRAM, AND INFORMATION PROCESSING SYSTEM

CROSS-REFERENCE TO RELATED APPLICATIONS

This application claims the benefit under 35 U.S.C. § 371 as a U.S. National Stage Entry of International Application No. PCT/JP2020/027196, filed in the Japanese Patent Office as a Receiving Office on Jul. 13, 2020, which claims priority to Japanese Patent Application Number JP2020-093877, filed in the Japanese Patent Office on May 29, 2020 and JP2019-152593, filed in the Japanese Patent Office on Aug. 23, 2019, each of which is hereby incorporated by reference in its entirety.

FIELD

The present disclosure relates to an information processing device, an information processing method, a program, and an information processing system.

BACKGROUND

In the fields of medicine, biochemistry, and the like, in general, a flow cytometer is used in order to quickly measure characteristics of each of a large number of particles. The flow cytometer is a device that irradiates a particle such as a cell or a bead flowing in a flow cell with a light beam to detect fluorescence, scattered light, or the like emitted from the particle, and optically measures characteristics of each particle.

CITATION LIST

Patent Literature

Patent Literature 1: JP 2007-132921 A
Patent Literature 2: JP 2016-511397 A

SUMMARY

Technical Problem

In a recent flow cytometer, multicoloring in which a particle such as a cell is stained with a plurality of fluorescent dyes has progressed. However, as the multicoloring progresses, the number of fluorescent substances that can be measured at one time increases, and combination explosion occurs. As a result, there is a problem that the amount of data to be processed increases and analysis is difficult.

Therefore, the present disclosure proposes an information processing device, an information processing method, a program, and an information processing system capable of analyzing data increased by multicoloring.

Solution to Problem

To solve the above-described problem, an information processing device according to one aspect of the present disclosure comprises: a dimensional compression unit that executes dimensional compression on each of a plurality of pieces of spectral data including a fluorescent component emitted from each of a plurality of particles labeled with one or more fluorescent dyes; an initial value determination unit that determines an initial value for each of a plurality of nodes on the basis of a result of the dimensional compression; and a clustering unit that executes clustering on the plurality of pieces of spectral data using the initial value.

Note that the above effects are not necessarily limited, and any of the effects described in the present specification or other effects that can be grasped from the present specification may be exhibited together with or instead of the above effects.

BRIEF DESCRIPTION OF DRAWINGS

FIG. 17 is a diagram for explaining operation for determining the number of clusters using consensus clustering, described in step S224 of FIG. 14.

DESCRIPTION OF EMBODIMENTS

Figure 1:
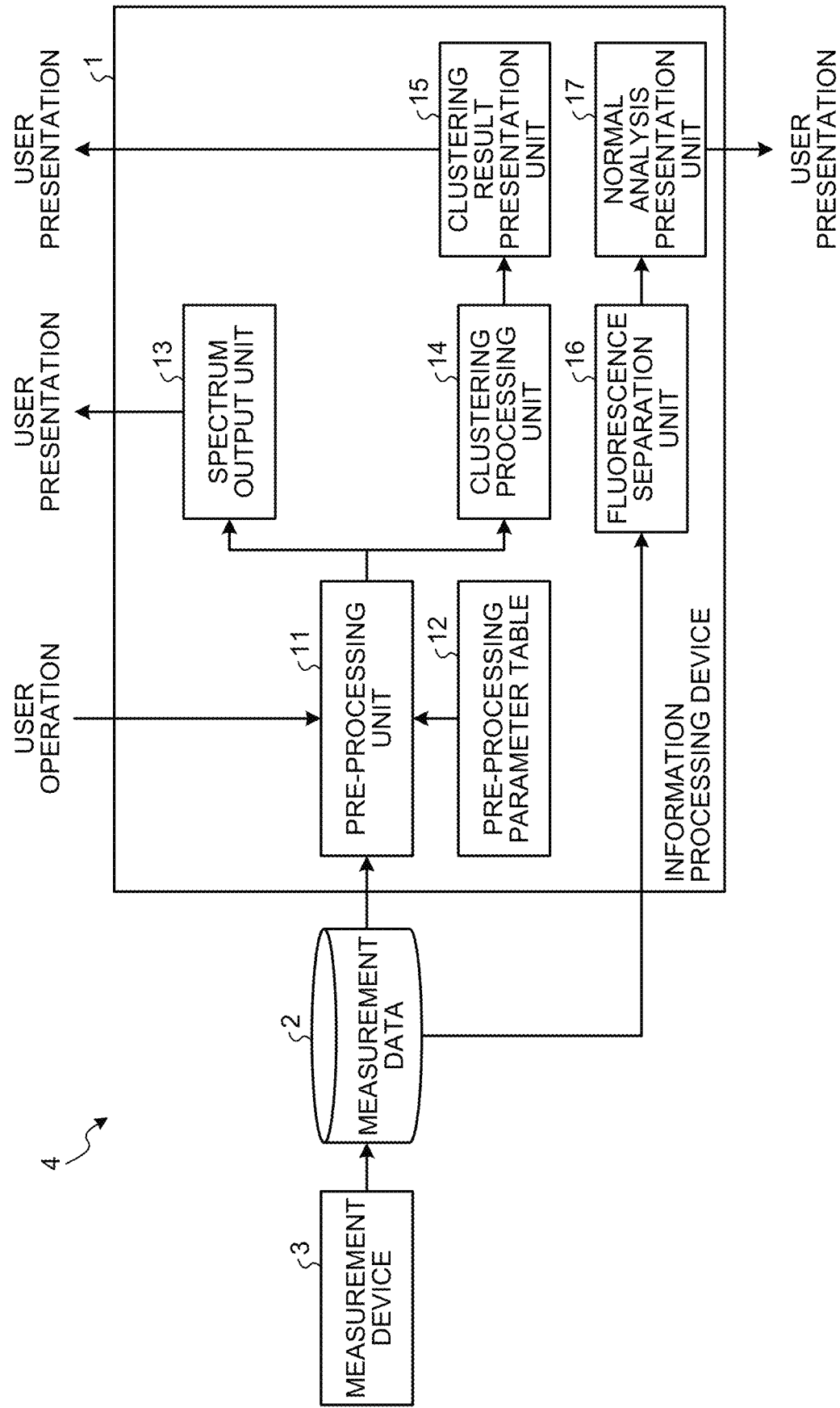
FIG. 1 is a block diagram illustrating a configuration of an information processing system according to a first embodiment.

Hereinafter, embodiments of the present disclosure will be described in detail with reference to the drawings. In addition, the present disclosure will be described according to the following item order.
  1. First Embodiment
  1.1 Configuration of information processing system
  1.2 Operation of information processing device
  1.3 Action and effect 2. Second Embodiment
2.1 Configuration of information processing system
2.2 Operation example of information processing device
2.2.1 Operation example of pre-processing/fluorescence separation unit
2.2.2 Operation example of clustering processing unit
2.2.3 Initialization of representative node vector
2.2.4 Clustering by batch learning
2.2.5 Determination of the number of clusters using consensus clustering
2.3 Action and effect
3. Hardware configuration of information processing device

1. First Embodiment

A recent flow cytometer can acquire more abundant information by staining a particle such as a cell with a plurality of fluorescent dyes and measuring many fluorescence signals at one time. Meanwhile, due to such multi-coloring of the flow cytometer, a limit of analysis by manual gating as in related art is pointed out. For example, when n types of fluorescent dyes are plotted in a two-dimensional coordinate system, there are nC2 combination patterns of fluorescent dyes. That is, there are 15 combination patterns for six colors, and there are 190 combination patterns for 20 colors.

As a method for analyzing such increased data, a method for adopting automatic classification by clustering instead of conventional manual gating, classifying data by clustering, and then analyzing the data is considered.

However, in general clustering, a certain piece of data is classified into any cluster. Therefore, even data that is located at a boundary between two or more clusters and is difficult to determine is classified into any cluster. Therefore, when data acquired by the flow cytometer is classified by clustering, there is a possibility that a certain degree of misclassification may occur.

Meanwhile, there are a filter type flow cytometer that detects intensity of one or more specific wavelengths in fluorescence and a spectrum type flow cytometer that can acquire more information by detecting fluorescence emitted from each fluorescent dye as a wavelength spectrum. In the spectral type flow cytometer, since fluorescence intensity for each wavelength is obtained, it is possible to acquire a large amount of features from one particle (also referred to as a sample). Therefore, by adopting the spectral type flow cytometer, more detailed analysis can be performed.

However, in spectral data obtained by the spectral type flow cytometer, the fluorescence intensity for each wavelength changes exponentially instead of linearly. Therefore, in order to display the spectral data easily recognizable to a user, it is necessary to perform scale conversion on the spectral data. Meanwhile, in clustering, classification is performed on the basis of a distance between pieces of data. Therefore, if the spectral data in which the fluorescence intensity for each wavelength changes exponentially is subjected to clustering as it is, a difference on a portion having large fluorescence intensity strongly affects the entire distance between pieces of data, and erroneous classification may occur. As a result, there is a possibility that a clustering result does not correctly correspond to spectral data to be subjected to scale conversion and displayed.

Therefore, in the present embodiment, an information processing device, an information processing method, a program, and an information processing system capable of making a display result of spectral data and a clustering result correspond to each other more correctly will be described with an example.

Specifically, logicle conversion is performed as pre-processing on spectral data acquired by the flow cytometer. Then, clustering is performed using the spectral data that has been subjected to the logicle conversion, and a clustering result obtained by the clustering is displayed to a user. As a result, in the present embodiment, it can be determined whether or not clustering is performed on a portion having a large value in the spectral data. Therefore, it is possible to perform clustering such that a display result of the spectral data and a clustering result more correctly correspond to each other. Hereinafter, the information processing device, the information processing method, the program, and the information processing system according to the present embodiment will be described in detail with reference to the drawings.

However, the technology according to the present disclosure does not need to solve all the above-described problems at the same time. Therefore, it is understood that those solving some or all of the above-described problems by including some or all of the configurations described later are included in the technical scope of the present disclosure.

1.1 Configuration of Information Processing System

FIG. 1 is a block diagram illustrating a configuration of an information processing system according to the present embodiment. As illustrated in FIG. 1, an information processing system 4 includes an information processing device 1 and a measurement device 3.

The measurement device 3 is a measurement device capable of detecting a fluorescence spectrum of each color from a cell or the like to be measured. The measurement device 3 is, for example, a flow cytometer. A measurement sample measured by the flow cytometer may be a biologically derived particle such as a cell, a microorganism, or a biologically relevant particle. For example, the cell may be an animal cell (for example, a corpuscle-based cell), or a plant cell. For example, the microorganism may be a bacterium such as *Escherichia coli*, a virus such as tobacco mosaic virus, or a fungus such as yeast. The biologically relevant particle may be a particle constituting a cell such as a chromosome, a liposome, mitochondria, or various organelles. Note that the biologically relevant particle may include a biologically relevant polymer such as a nucleic acid, a protein, a lipid, a sugar chain, or a complex thereof. Each of these biologically derived particles may have either a spherical shape or a non-spherical shape, and is not particularly limited in size and mass.

In addition, the measurement sample may be an industrially synthesized particle such as a latex particle, a gel particle, or an industrial particle. For example, the industrially synthesized particle may be a particle synthesized with an organic resin material such as polystyrene or polymethyl methacrylate, an inorganic material such as glass, silica, or a magnetic body, or a metal such as gold colloid or aluminum. Similarly, each of these industrially synthesized particles may have either a spherical shape or a non-spherical shape, and is not particularly limited in size and mass.

The measurement sample can be labeled (stained) with one or more fluorescent dyes prior to measurement of a fluorescence spectrum. The measurement sample may be labeled with a fluorescent dye by a known method. Specifically, when the measurement sample is a cell, a fluorescently labeled antibody that is selectively bonded to an antigen present on a cell surface is mixed with a cell to be measured, and the fluorescently labeled antibody is bonded to an antigen on a surface of the cell. As a result, the cell to be measured can be labeled with a fluorescent dye. Alternatively, the cell to be measured can be labeled with a fluorescent dye by mixing a fluorescent dye that is selectively taken into a specific cell with the cell to be measured.

The fluorescently labeled antibody is an antibody to which a fluorescent dye is bonded as a label. The fluorescently labeled antibody may be an antibody to which a fluorescent dye is directly bonded. Alternatively, the fluorescently labeled antibody may be an antibody obtained by bonding a fluorescent dye to which avidin is bonded to a biotin-labeled antibody by an avidin-biotin reaction. Note that as the antibody, either a polyclonal antibody or a monoclonal antibody can be used.

The fluorescent dye for labeling a cell is not particularly limited, and at least one or more known dyes used for staining a cell or the like can be used. For example, as the fluorescent dye, phycoerythrin (PE), fluorescein isothiocyanate (FITC), PE-Cy5, PE-Cy7, PE-Texas Red (registered trademark), allophycocyanin (APC), APC-Cy7, ethidium bromide, propidium iodide, Hoechst (registered trademark) 33258, Hoechst (registered trademark) 33342, 4',6-diamidino-2-phenylindole (DAPI), acridineorange, chromomycin, mithramycin, olivomycin, pyronin Y, thiazole orange, rhodamine 101, isothiocyanate, BCECF, BCECF-AM, C. SNARF-1, C. SNARF-1-AMA, aequorin, Indo-1, Indo-1-AM, Fluo-3, Fluo-3-AM, Fura-2, Fura-2-AM, oxonol, Texas Red (registered trademark), Rhodamine 123, 10-N-nonyacridine orange, fluorescein, fluorescein diacetate, carboxyfluorescein, carboxyfluorescein diacetate, carboxydichlorofluorescein, and carboxydichlorofluorescein diacetate can be used. In addition, derivatives of the above-described fluorescent dyes and the like can also be used.

The flow cytometer includes a laser light source that emits laser light having a wavelength capable of exciting a fluorescent dye with which a measurement sample S is labeled, a flow cell through which the measurement sample S flows in one direction, and a photodetector that receives one or more of fluorescence, phosphorescence, and scattered light from the measurement sample S irradiated with the laser light.

The laser light source is, for example, a semiconductor laser light source that emits laser light having a predetermined wavelength. A plurality of laser light sources may be disposed. When the plurality of laser light sources is disposed, positions irradiated with laser light from the laser light sources may be the same as or different from each other in the flow cell. However, in a case where different positions are irradiated with laser light from the plurality of laser light sources, light from the measurement sample S can be detected by different photodetectors. In such a case, even in a case where dyes that emit fluorescent rays having close wavelengths are used, a fluorescence spectrum of each of the fluorescent rays can be measured without color mixing. Note that the laser light emitted from the laser light source may be either pulsed light or continuous light. For example, as the laser light source, a plurality of semiconductor laser light sources that emits laser light having a wavelength of 480 nm and laser light having a wavelength of 640 nm may be used.

The flow cell is a flow path through which the plurality of measurement samples S flows in line in one direction. Specifically, through the flow cell, a sheath liquid enclosing the measurement samples S flows at a high speed as a laminar flow, and the plurality of measurement samples S thereby flows in line in one direction. The flow cell can be formed in a microchip or a cuvette.

The photodetector detects light from the measurement sample S irradiated with laser light by photoelectric conversion. The light from the measurement sample S can include at least one of fluorescence, phosphorescence, and scattered light.

For example, the photodetector may include a detector that detects scattered light LS including forward scattered light and side scattered light from the measurement sample S, and a light receiving element array that detects fluorescence from the measurement sample S.

The detector may be, for example, a known photoelectric conversion element such as a charge coupled device (CCD), a complementary metal oxide semiconductor (CMOS), or a photodiode. The light receiving element array can be constituted by, for example, arranging a plurality of independent detection channels having different wavelength ranges of light to be detected. Specifically, the light receiving element array may be a light receiving element array in which a plurality of photo multiplier tubes (PMTs) or photodiodes having different wavelength ranges to be detected are arranged one-dimensionally or the like, an image sensor in which pixels are arranged in a two-dimensional lattice pattern, or the like. The light receiving element array photoelectrically converts fluorescence from the measurement sample S spectrally dispersed for each wavelength by a spectroscopic element such as a prism or a grating.

In the flow cytometer having the above configuration, first, the measurement sample S flowing in the flow cell is irradiated with laser light emitted from the laser light source. The measurement sample S emits scattered light and fluorescence (or phosphorescence) by being irradiated with the laser light. The scattered light emitted from the measurement sample S is detected by the detector. Meanwhile, the fluorescence emitted from the measurement sample S is spectrally dispersed into light for each wavelength by the spectroscopic element and then received by the light receiving element array. As a result, a spectrum of the fluorescence emitted from the measurement sample S is detected.

Figures 2, 3:
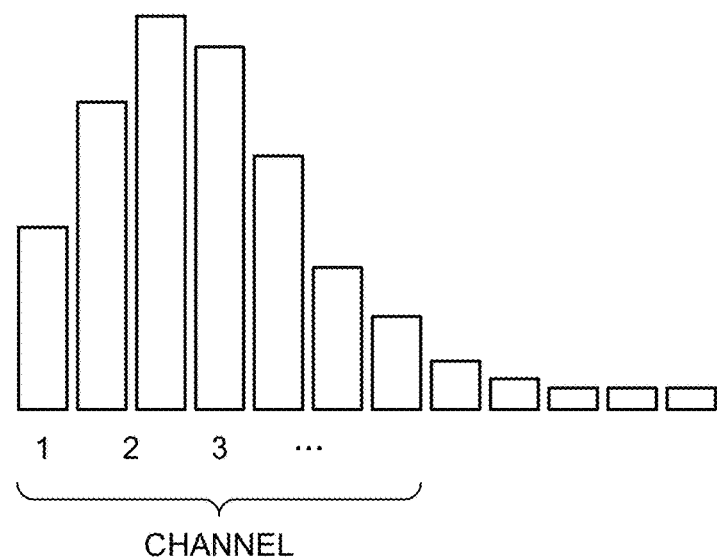
FIG. 2 is a diagram illustrating an example of a fluorescence spectrum.
FIG. 3 is a diagram illustrating an example of a pre-processing parameter table.

Note that in the following description, it is assumed that a cell is to be measured. The measurement device 3 is, for example, a spectrum type flow cytometer that causes a fluorescent-stained cell to flow through a flow cell at a high speed and irradiates the flowing cell with a light beam to detect a fluorescence spectrum for each fluorescent dye emitted from the cell. FIG. 2 is a diagram illustrating an example of the fluorescence spectrum. As illustrated in FIG. 2, the fluorescence spectrum is expressed by fluorescence intensity for each channel corresponding to a wavelength.

The measurement device 3 outputs a detected fluorescence spectrum as measurement data 2. The measurement data 2 includes spectral data of fluorescence for each cell. The measurement device 3 transfers the measurement data 2 to, for example, the information processing device 1.

The information processing device 1 acquires and analyzes the measurement data 2 measured by the measurement device 3, and displays an analysis result. Note that the information processing device 1 and the measurement device 3 may be connected to each other via a network, and the information processing device 1 may acquire the measurement data 2 via the network.

The information processing device 1 includes a pre-processing unit 11, a pre-processing parameter table 12, a spectrum output unit 13, a clustering processing unit 14, a clustering result presentation unit 15, a fluorescence separation unit 16, and a normal analysis presentation unit 17. Note that all or some of these functional units may be performed in a cloud. For example, the pre-processing parameter table 12, the clustering processing unit 14, and the fluorescence separation unit 16 may be performed in a cloud. In this case, the measurement data 2 is also transferred to the cloud.

The pre-processing unit 11 performs pre-processing on spectral data according to a selected parameter. Here, the pre-processing is coordinate conversion for performing display from an actual observation value. The conversion may be, for example, simple log 10 conversion or logicle conversion considering characteristics of an observation device. The parameter includes W, T, M, and A.

W is a value that linearly displays a value near zero. T is a maximum value of fluorescence intensity, and is, for example, $10^4$. M is a maximum value of a display coordinate after conversion. A is a minimum negative value to be converted.

The pre-processing parameter table 12 is a table that stores a pre-processing parameter. FIG. 3 is a diagram illustrating an example of the pre-processing parameter table 12. As illustrated in FIG. 3, the pre-processing parameter table 12 stores a plurality of combinations (also referred to as parameter sets) of values of W, T, M, and A. A parameter ID is an identifier that identifies a combination of parameters.

The pre-processing unit 11 performs logicle conversion using a combination of W, T, M, and A selected from the pre-processing parameter table 12 by a user. Note that the pre-processing unit 11 may use a default value instead of selecting a parameter from the pre-processing parameter table 12. Alternatively, a user can designate a value other than a value stored in the pre-processing parameter table 12. The pre-processing unit 11 performs pre-processing every time a user changes a pre-processing parameter. Note that the pre-processing unit 11 may perform conversion of non-linear processing such as log conversion or bi-exponential conversion instead of logicle conversion.

Figure 4:
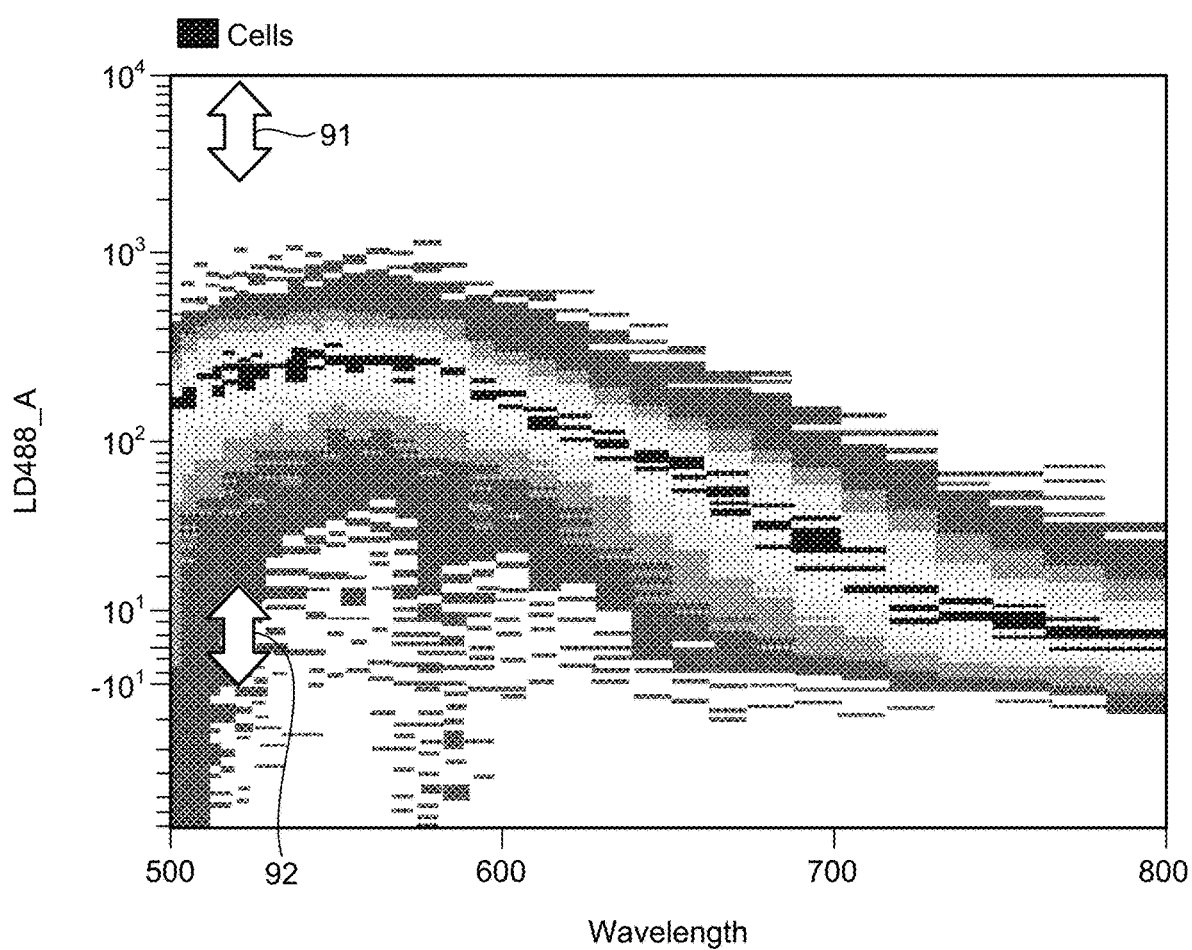
FIG. 4 is a diagram illustrating an example of a spectrum plot.

The spectrum output unit 13 generates an image of a spectrum plot using spectral data that has been pre-processed by the pre-processing unit 11, and displays the generated image. FIG. 4 is a diagram illustrating an example of the spectral plot. The spectral plot indicates a detection wavelength (wavelength) on the horizontal axis and fluorescence intensity on the vertical axis, and expresses information (population information) regarding the number of fine particles (the number of events or the density) by different color shades, color tones, and the like.

In FIG. 4, "LD 488" on the vertical axis indicates fluorescence when laser light having a wavelength of 488 nm (nanometre) is emitted, and "A" indicates that a measured value is cumulative intensity. In addition, in FIG. 4, information regarding the number of fine particles is expressed by shading, but in an actual screen, the information regarding the number of fine particles is expressed by color.

As illustrated in the vertical axis in FIG. 4, in the spectrum plot, the vertical axis corresponding to fluorescence intensity is subjected to logicle conversion and displayed. For this reason, arrow 91 and arrow 92 are displayed with the same length in FIG. 4, but ranges indicated by the arrows are largely different from each other. That is, when the vertical axis is linear, the lengths are completely different from each other, and the length of arrow 91 is much longer than that of arrow 92.

The clustering processing unit 14 perform clustering on a cell using spectral data that has been pre-processed by the pre-processing unit 11. K is designated, for example, as K-means, and the clustering processing unit 14 classifies the spectral data into K clusters. Alternatively, the clustering processing unit 14 may automatically determine the number of divisions as in Flow self-organizing map (FlowSOM).

Alternatively, for example, as in T-SNE, the clustering processing unit 14 may perform dimensional compression and perform gating on a result of the dimension compression to perform clustering. Alternatively, the clustering processing unit 14 may perform two-stage clustering such as meta clustering and use two cluster definitions such as a cluster ID and a meta cluster ID. Here, the meta cluster is a collection of clusters.

By performing clustering using spectral data that has been subjected to logicle conversion, the clustering processing unit 14 can easily make a display result of the spectral data correspond to a clustering result.

Figure 5:
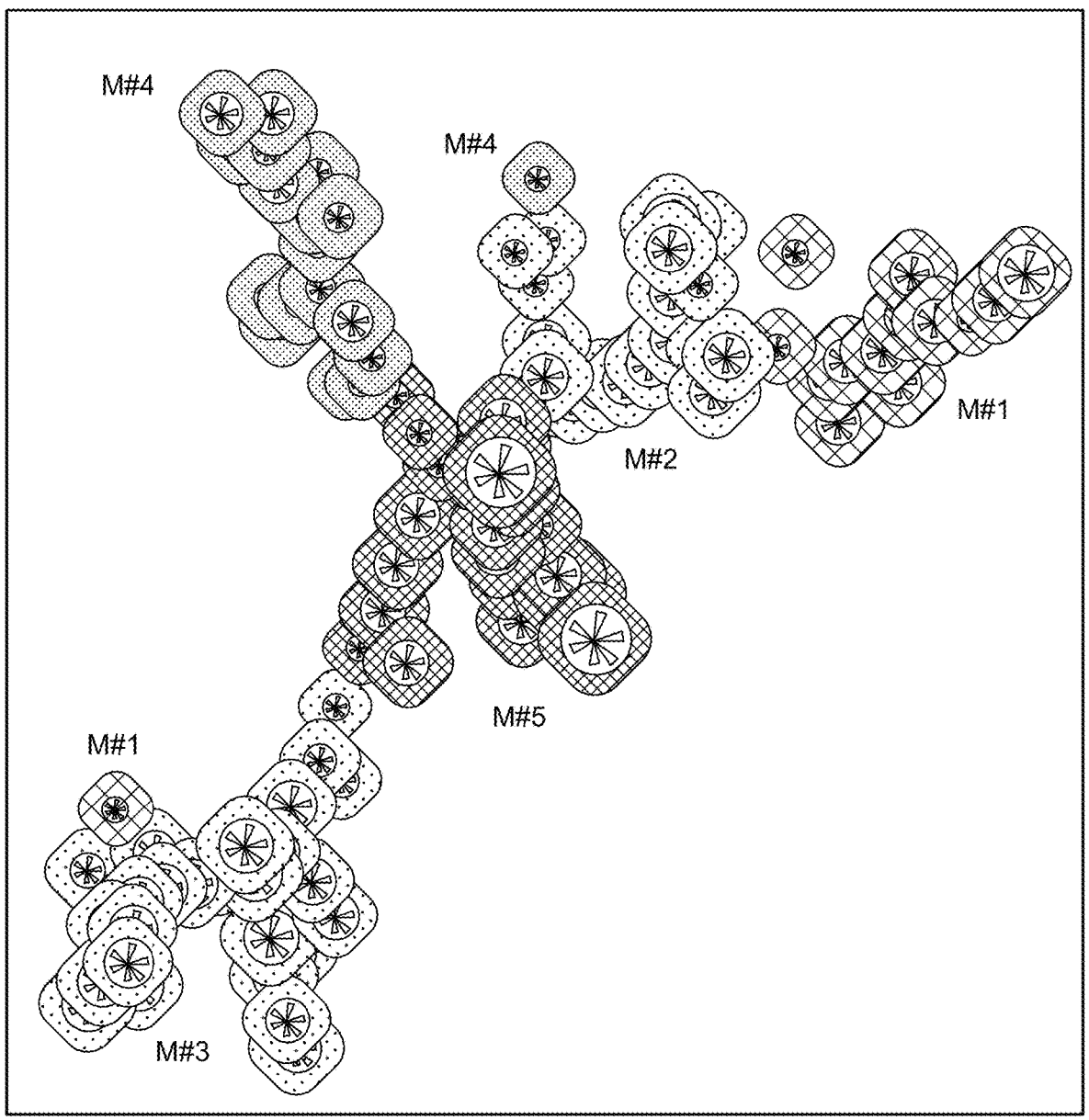
FIG. 5 is a diagram illustrating an example of a clustering result.

The clustering result presentation unit 15 displays a clustering result by the clustering processing unit 14 on a display device. The clustering result presentation unit 15 visualizes the number of classifications or which cell group belongs to which group. FIG. 5 is a diagram illustrating an example of the clustering result. FIG. 5 illustrates a case where clustering is performed using FlowSOM. In FIG. 5, circles indicate clusters, and the clusters are classified into meta clusters M #1 to M #5 with different shadings. In actual display, the meta clusters M #1 to M #5 are displayed in different colors. By display of the clustering result, a user can be notified of a distribution of clusters and meta clusters.

Figure 6:
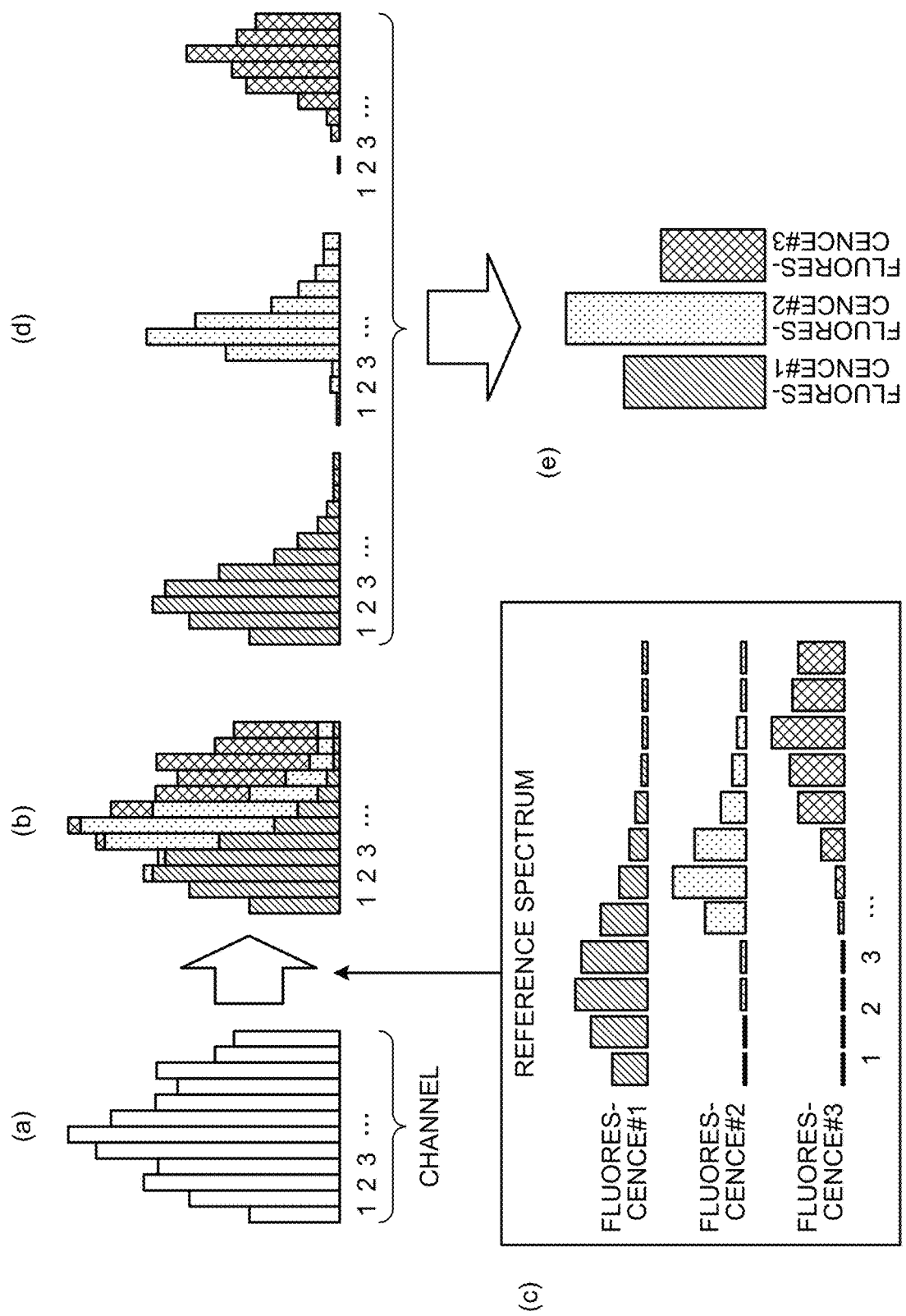
FIG. 6 is a diagram for explaining fluorescence separation processing.

The fluorescence separation unit 16 acquires the measurement data 2 and performs fluorescence separation processing (also referred to as unmixing). FIG. 6 is a diagram for explaining fluorescence separation processing. FIG. 6(*a*) illustrates a measured fluorescence spectrum. As illustrated in FIG. 6(*b*), the measured fluorescence spectrum is obtained by superimposing fluorescence spectra of, for example, three fluorescent rays.

Therefore, the fluorescence separation unit 16 separates the spectrum into three spectra of fluorescence #1 to #3 using a reference spectrum illustrated in FIG. 6(*c*). Here, the reference spectrum is a fluorescence spectrum for each fluorescence. The spectra of the separated fluorescence #1 to #3 are illustrated in FIG. 6(*d*). The fluorescence separation unit 16 calculates fluorescence intensity by, for example, taking a weighted average using the spectrum separated for each fluorescence. FIG. 6(*e*) illustrates the intensities of the fluorescence #1 to #3 calculated by the fluorescence separation unit 16.

Figure 7:
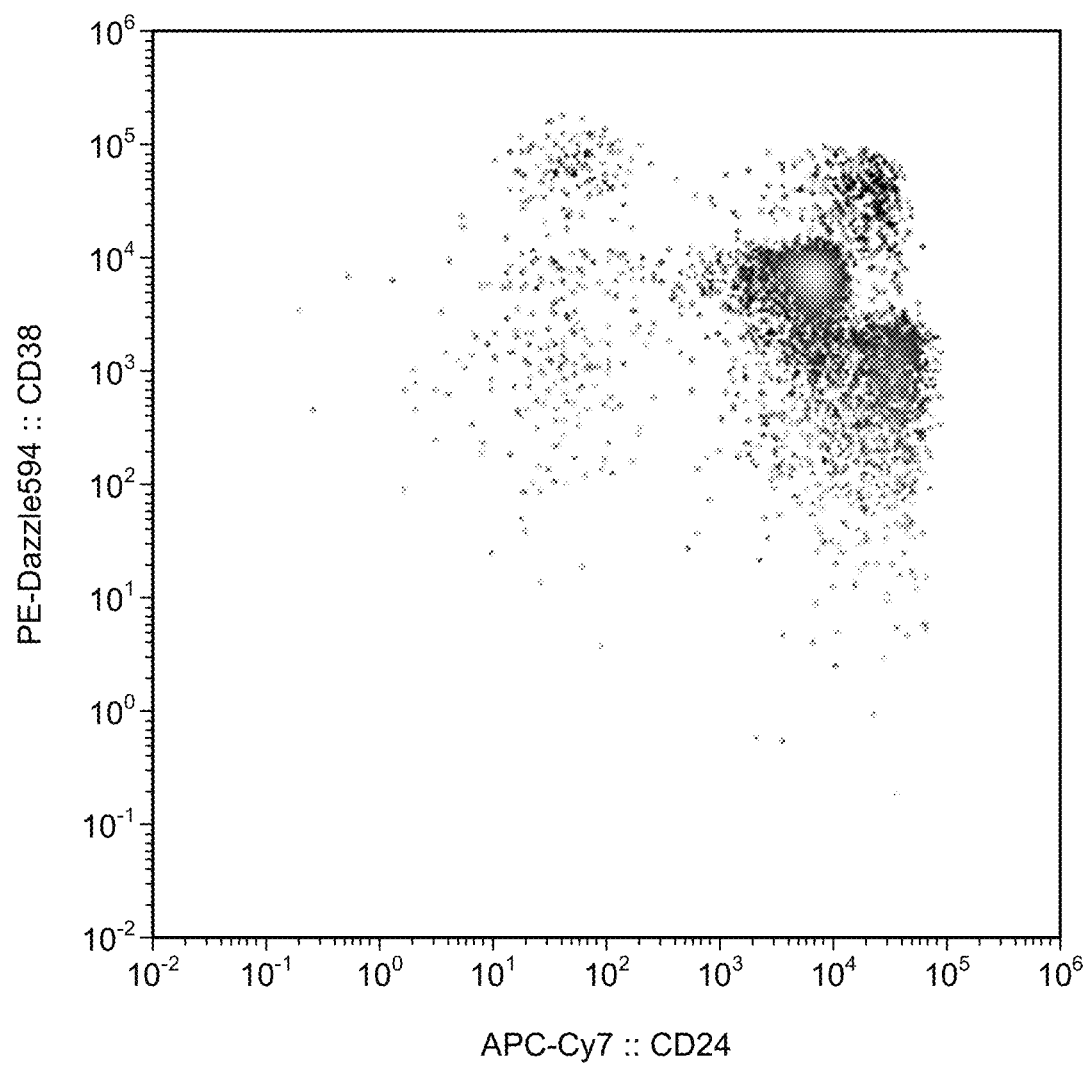
FIG. 7 is a diagram illustrating a display example of an analysis result.

The normal analysis presentation unit 17 performs analysis using the fluorescence intensity separated by the fluorescence separation unit 16 and displays an analysis result on a display device. FIG. 7 is a diagram illustrating a display example of the analysis result. FIG. 7 illustrates a two-dimensional plot with two axes, APC-Cy7::CD 24 and PE-Dazzle 594::CD 38. Here, APC-Cy7::CD 24 and PE-Dazzle 594::CD 38 are fluorescent dye-labeled antibodies used for measurement of fluorescence intensity. "APC-Cy7" and "PE-Dazzle 594" are fluorescent dyes, and "CD 24" and "CD 38" are antibodies. By the two-dimensional plot, a user can be notified of a distribution of cells with respect to the two fluorescent dyes.

Note that the information processing device 1 may perform pre-processing and clustering on a cell group included in a partial region of the two-dimensional plot in response to selection of the partial region by a user, and display a clustering result. In addition, the information processing device 1 may perform pre-processing and clustering on a cell group included in a partial region of the spectral plot in response to selection of the partial region by a user, and display a clustering result. In particular, a characteristic portion such as dense portion in the spectral plot is often selected by a user.

1.2 Operation of Information Processing Device

Figure 8:
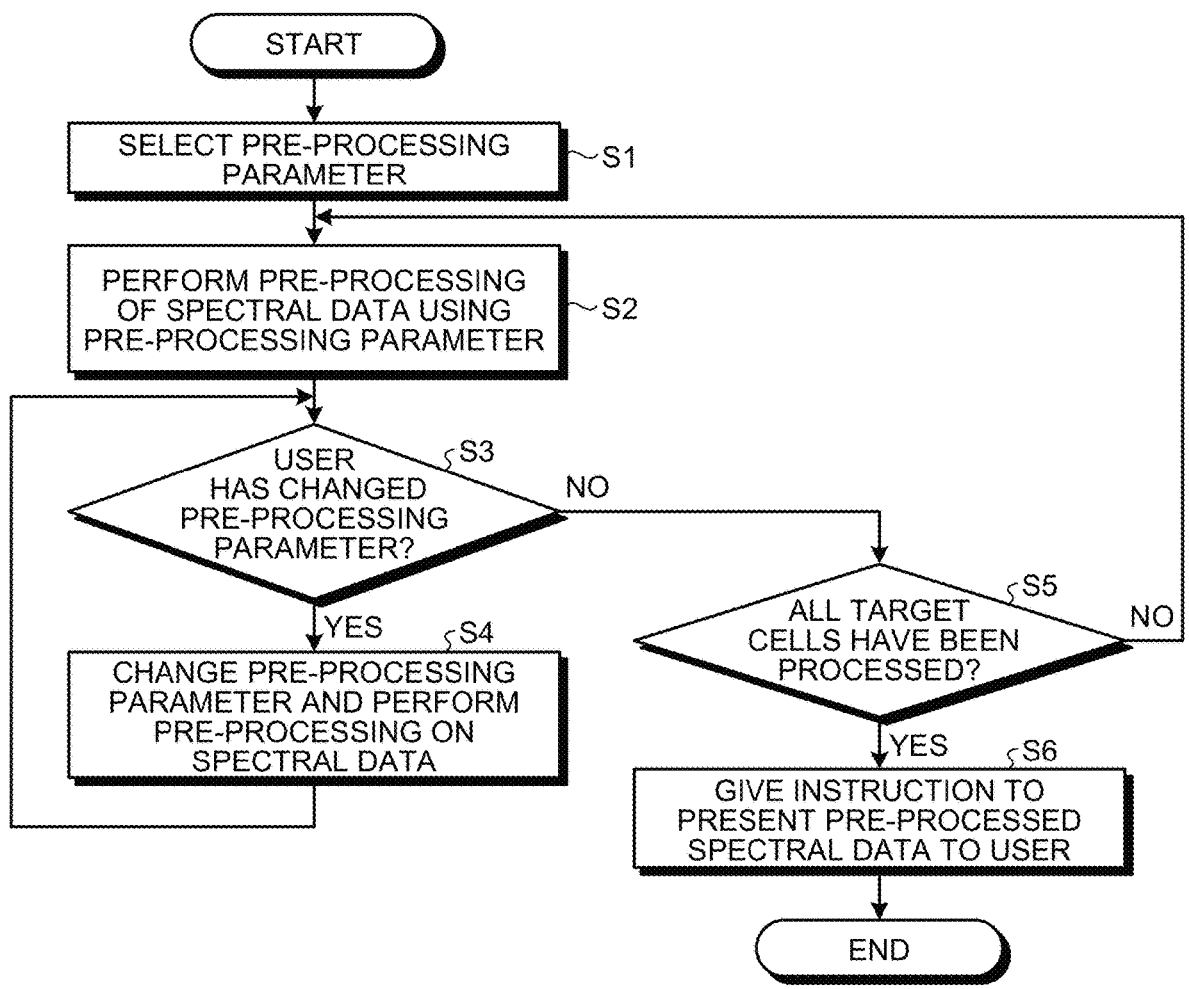
FIG. 8 is a flowchart illustrating a flow of pre-processing by a pre-processing unit.

Next, operation of the information processing device 1 will be described with reference to FIGS. 8 to 10. FIG. 8 is a flowchart illustrating a flow of pre-processing by the pre-processing unit 11. As illustrated in FIG. 8, the pre-processing unit 11 selects a pre-processing parameter on the basis of a user's instruction (step S1).

Then, the pre-processing unit 11 performs pre-processing on spectral data using the pre-processing parameter (step S2). Then, the pre-processing unit 11 determines whether or not a user has changed the pre-processing parameter (step S3). If the user has changed the pre-processing parameter, the pre-processing unit 11 changes the pre-processing parameter and performs pre-processing on the spectral data (step S4). The process returns to step S3.

Meanwhile, if the user does not change the pre-processing parameter, the pre-processing unit 11 determines whether or not all target cells have been processed (step S5). If there is a target cell that has not been processed, the process returns to step S2, and another cell is processed. Meanwhile, if all target cells have been processed, the pre-processing unit 11 instructs the spectrum output unit 13 to present the pre-processed spectral data to a user (step S6). In addition, the pre-processing unit 11 transmits the pre-processed spectral data to the clustering processing unit 14.

As described above, the pre-processing unit 11 performs pre-processing on the spectral data, and the clustering processing unit 14 can thereby make the clustering result correspond to the display result of the spectral data.

Figure 9:
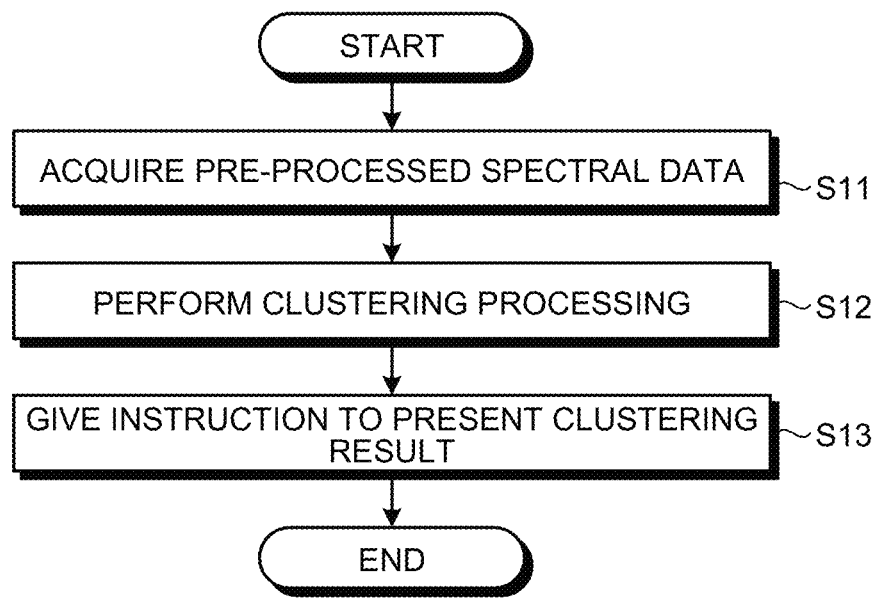
FIG. 9 is a flowchart illustrating a flow of processing by a clustering processing unit.

FIG. 9 is a flowchart illustrating a flow of processing by the clustering processing unit 14. As illustrated in FIG. 9, the clustering processing unit 14 acquires the pre-processed spectral data from the pre-processing unit 11 (step S11), and performs clustering processing (step S12). Then, the clustering processing unit 14 instructs the clustering result presentation unit 15 to present a clustering result (step S13).

As described above, since the clustering processing unit 14 performs clustering using the pre-processed spectral data, it is possible to make the clustering result correspond to the display result of the spectral data.

Figure 10:
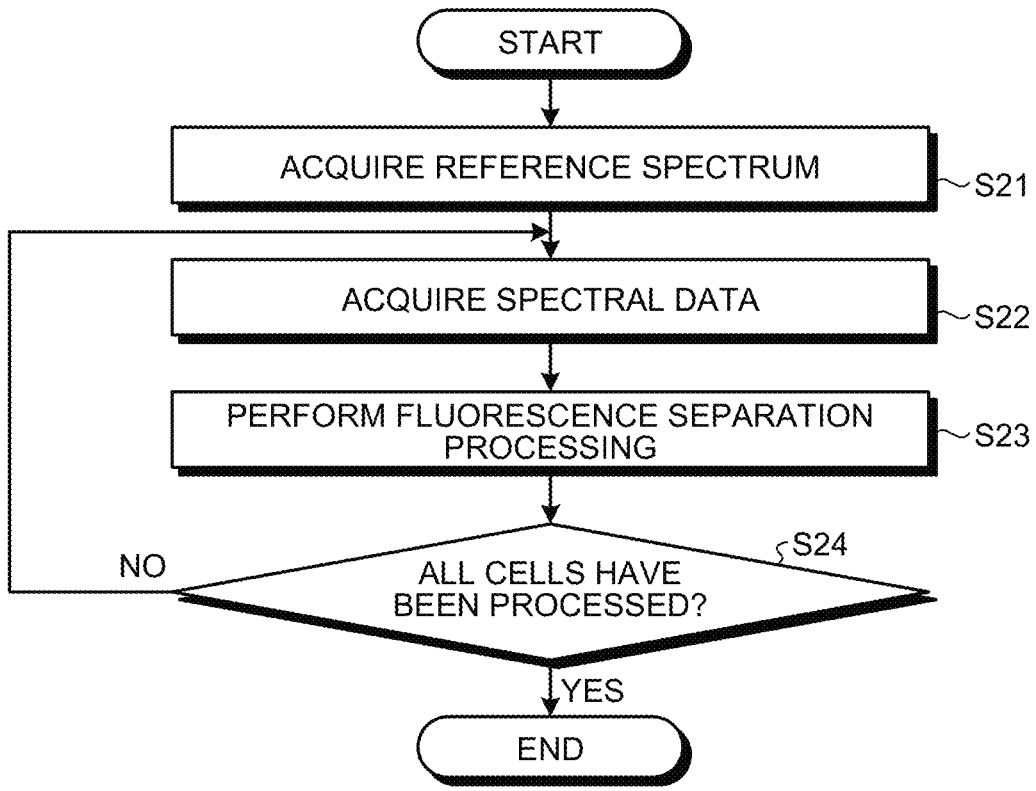
FIG. 10 is a flowchart illustrating a flow of fluorescence separation processing by a fluorescence separation unit.

FIG. 10 is a flowchart illustrating a flow of fluorescence separation processing by the fluorescence separation unit 16. As illustrated in FIG. 10, the fluorescence separation unit 16 acquires a reference spectrum (step S21). Then, the fluorescence separation unit 16 acquires spectral data for one cell (step S22) and performs fluorescence separation processing (step S23). Then, the fluorescence separation unit 16 determines whether or not all cells have been processed (step S24). If there is a cell that has not been processed, the process returns to step S22. If all cells have been processed, fluorescence separation processing ends.

As described above, since the fluorescence separation unit 16 performs fluorescence separation processing, the normal analysis presentation unit 17 can analyze the fluorescence data and display the analysis result.

1.3 Action and Effect

As described above, according to an embodiment, the pre-processing unit 11 acquires spectral data and performs logicle conversion as pre-processing. Then, the clustering processing unit 14 performs clustering using spectral data that has been subjected to logicle conversion. Then, the clustering result presentation unit 15 displays ae clustering result on a display device. Therefore, the information processing device 1 can prevent clustering from being performed on a portion having a large value in the spectral data. Therefore, the information processing device 1 can perform clustering such that the display result of the spectral data and the clustering result correspond to each other.

2. Second Embodiment

As described above, the recent flow cytometer has become multispectral, in which a particle such as a cell is stained with a plurality of fluorescent dyes.

As the flow cytometer becomes multispectral, the number of fluorescent substances that can be measured at one time increases, and as a result, combination explosion occurs. Therefore, it is difficult to perform analysis by a human hand. For example, in a case where N (N is a natural number) colors are measured at one time, when each of the colors is treated two-dimensionally, there are n (n−1)/2 combinations, and the number of combinations increases in proportion to a half of the square of the number of colors N.

As a method for analyzing data increased by such combination explosion, for example, a method for classifying data by clustering such as FlowSOM and then analyzing the data is considered as described above.

Figure 11:
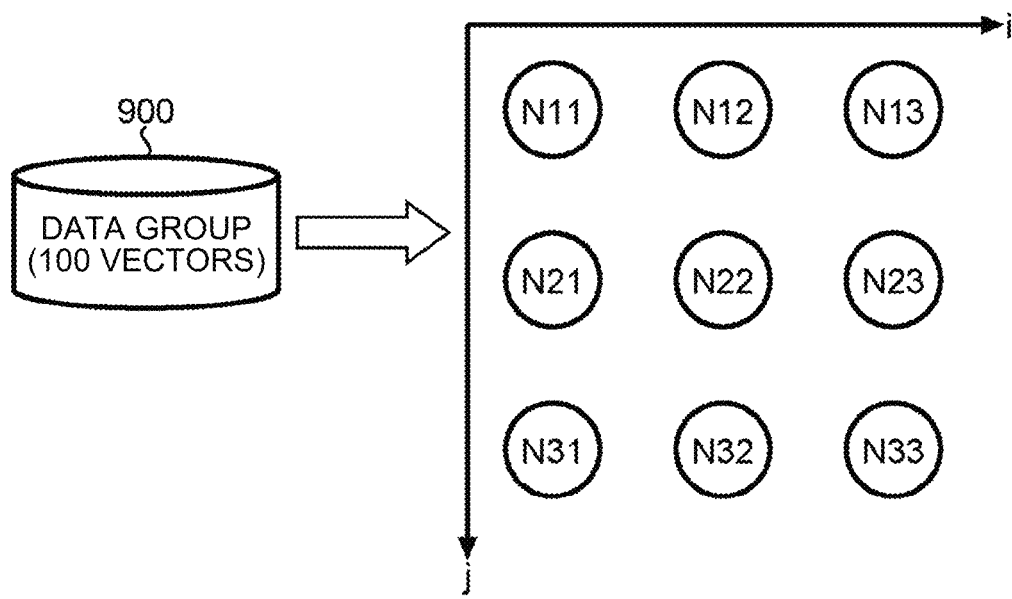
FIG. 11 is a schematic diagram for explaining a series of flow from initialization to learning in FlowSOM.

FIG. 11 is a schematic diagram for explaining a series of flow from initialization to learning in FlowSOM. The example illustrated in FIG. 11 indicates a case where 100 vectors (coordinate values) included in a data group 900 to be analyzed are classified into nine representative nodes N11 to N33 arranged in three rows and three columns in a two-dimensional coordinate system in an initial state.

In the example illustrated in FIG. 11, first, a predetermined number (nine in this example) of pieces of data are selected from the data group 900 by random sampling, and the selected pieces of data are set as initial node vectors $N\_ij$ of the representative nodes N11 to N33 (step S1).

Next, learning to update the representative node vector $N\_ij$ of each of the representative nodes N11 to N33 is executed. Specifically, first, one piece of data is acquired from the data group 900 by random sampling (step S2).

Subsequently, processing represented by the following formula (1) is executed on a representative node closest to the acquired data (vector), and the representative node vector $N\_ij$ of the representative node is thereby updated (step S3). Note that in formula (1), $\alpha$ represents a learning ratio. The learning ratio $\alpha$ may be set on the basis of an empirical rule or the like, and may be, for example, a value such as 0.1 or 0.01.

$$\text{New representative node vector } N\_ij = (1-\alpha) \times \text{old representative node vector } N\_ij + \alpha \times \text{vector of acquired data} \quad (1)$$

Subsequently, on a representative node located around the representative node having the representative node vector $N\_ij$ updated in step S3 (hereinafter, a peripheral representative node), processing of further multiplying the change by the formula (1) by $\beta$, represented by the following formula (2), is executed, and a representative node vector of the peripheral representative node (hereinafter, referred to as a peripheral representative node vector) $N\_ij$ is thereby updated (step S4). Note that in formula (2), $\beta(r)$ may be a parameter of an algorithm determined on the basis of an empirical rule, and may be, for example, a value such as 0.1 or 0.01. In addition, $\beta(r)$ may be a fixed value or may be changed depending on the number of times of learning. For example, a β(r) value may be changed between first learning and second learning. The same may apply to a.

New peripheral representative node vector $N\_ij$=(1−β(r))×old peripheral representative node vector+ β(r)×vector of acquired data    (2)

Note that, in formula (2), r may be a distance from a node to be updated, or may be a variable for weighting β with a function related to the distance. For example, β(r)=0.9 can be set for a node adjacent to the node to be updated, and β(r)=0.5 can be set for a node adjacent to the node adjacent to the node to be updated. As described above, β(r) may be changed depending on the number of times of learning, and for example, the value of β may be reduced as the number of times of learning increases.

Thereafter, the processing in steps S2 to S4 is repeatedly executed until the processing for all the pieces of data included in the data group 900 is completed.

However, in such FlowSOM, since the SOM algorithm is used, there are the following problems.

First, in initialization of a representative node of SOM (hereinafter, also referred to as an SOM node), as described above, since an initial node vector is determined by random sampling of data (step S1), there is a problem that a clustering result varies depending on execution.

Second, in the SOM algorithm, since clustering is executed while learning is executed by random sampling (steps S2 to S4), there is a problem that a learning result varies depending on sampling order, and as a result, a clustering result varies depending on execution.

Third, as a derivative from the second problem, since learning is performed sequentially by random sampling (steps S2 to S4), the processing is inseparable processing in which updating of a vector of an SOM node cannot be parallelized (divided). As a result, there is a problem that processing efficiency or processing speed cannot be improved.

In addition, although the multispectral flow cytometer makes more detailed analysis possible, the amount of data handled increases at the same time. Therefore, there is also a problem that an increase in processing time or a curse of dimensions easily occurs when data is classified by clustering.

Furthermore, in recent years, the number of pieces of data to be analyzed has increased due to an improvement in measurement speed of the flow cytometer. However, when the number of pieces of data increases, there is not only a problem that drawing time in data analysis increases, but also a problem that analysis time increases due to a simple increase in the number of targeted clusters in addition to the increase in the drawing time when a cluster generated by a user is additionally analyzed.

Therefore, in the present embodiment, an information processing device, an information processing method, a program, and an information processing system capable of efficiently executing clustering capable of suppressing variations in results depending on execution will be described with an example.

However, the technology according to the present disclosure does not need to solve all the above-described problems at the same time. Therefore, it is understood that those solving some or all of the above-described problems by including some or all of the configurations described later are included in the technical scope of the present disclosure.

In addition, in the following description, the same reference numerals are given to similar configurations and operations to those of the above-described first embodiment, and detailed description thereof is omitted.

2.1 Configuration of Information Processing System

Figure 12:
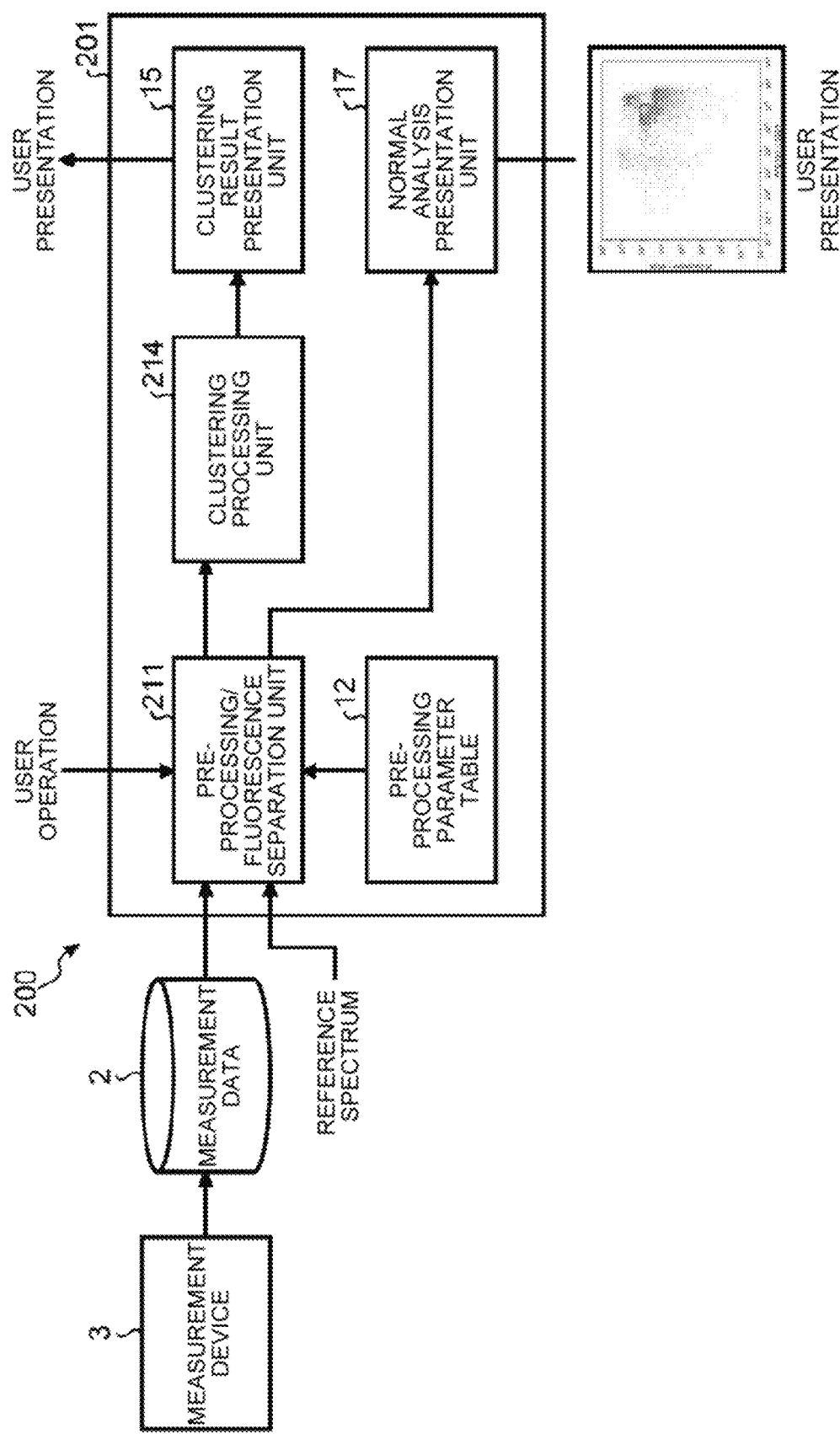
FIG. 12 is a block diagram illustrating a configuration of an information processing system according to a second embodiment.

FIG. 12 is a block diagram illustrating a configuration of an information processing system according to the present embodiment. As illustrated in FIG. 12, an information processing system 200 includes an information processing device 201 and a measurement device 3. In the present embodiment, the measurement device 3 and a measurement sample may be similar to the measurement device 3 and the measurement sample described in the first embodiment, and therefore detailed description thereof is omitted here.

The information processing device 201 includes a pre-processing/fluorescence separation unit 211, a pre-processing parameter table 12, a spectrum output unit 13, a clustering processing unit 214, a clustering result presentation unit 15, and a normal analysis presentation unit 17. In this configuration, the pre-processing parameter table 12, the clustering result presentation unit 15, and the normal analysis presentation unit 17 may be similar to those according to the first embodiment. In addition, the pre-processing/fluorescence separation unit 211 may have the functions of both the pre-processing unit 11 and the fluorescence separation unit 16 according to the first embodiment. Note that the spectrum output unit 13 is omitted in FIG. 12, but a spectrum output unit 13 similar to that of the first embodiment may be added.

Similarly to the fluorescence separation unit 16 according to the first embodiment, the pre-processing/fluorescence separation unit 211 separates measurement data 2, which is spectral data, into a fluorescence spectrum for each fluorescent dye by using a reference spectrum. Then, the pre-processing/fluorescence separation unit 211 executes pre-processing such as Logicle conversion on an unmixed fluorescence spectrum. The pre-processed fluorescence spectrum for each fluorescent dye is presented to a user by the normal analysis presentation unit 17.

Note that a parameter set of conversion parameters used in the pre-processing may be selected by a user's designation of a parameter set to be used from parameter sets managed in the pre-processing parameter table 12 (see FIG. 3) as in the first embodiment. In addition, the parameter sets managed in the pre-processing parameter table 12 may be finely adjustable by a user.

The clustering processing unit 214 according to the present embodiment executes clustering processing on the pre-processed fluorescence spectrum output from the pre-processing/fluorescence separation unit 211. A clustering result generated by the clustering processing unit 214 is presented to a user by the clustering result presentation unit 15.

2.2 Operation Example of Information Processing Device

Next, operation of the information processing device 201 according to the present embodiment will be described.

2.2.1 Operation Example of Pre-Processing/Fluorescence Separation Unit

Figure 13:
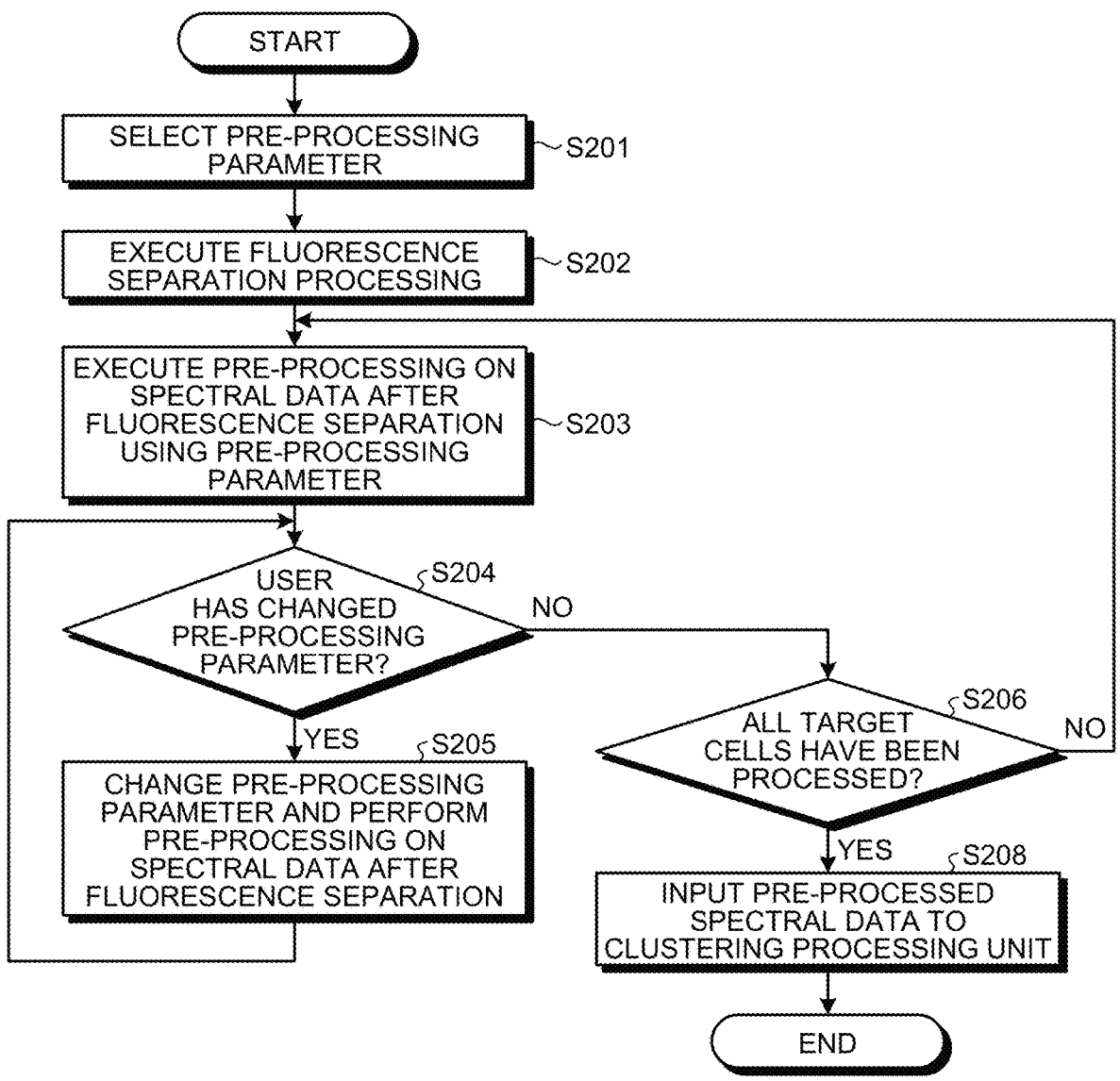
FIG. 13 is a flowchart illustrating an operation example of a pre-processing/fluorescence separation unit according to the second embodiment.

First, an operation example of the pre-processing/fluorescence separation unit 211 according to the present embodiment will be described. FIG. 13 is a flowchart illustrating an operation example of the pre-processing/fluorescence separation unit according to the present embodiment. As illustrated in FIG. 13, in the present embodiment, the pre-processing/fluorescence separation unit 211 first selects a pre-processing parameter on the basis of a user's instruction as in step S1 of FIG. 8 (step S201).

Next, similarly to the fluorescence separation processing described with reference to FIG. 10 in the first embodiment, the pre-processing/fluorescence separation unit 211 executes fluorescence separation processing using a reference spectrum on spectral data of all the cells included in the measurement data 2 (step S202).

Next, as in steps S2 to S5 of FIG. 8, the pre-processing/fluorescence separation unit 211 executes pre-processing using a pre-processing parameter selected or changed by a user on the spectral data of all the cells included in the measurement data 2 (steps S203 to S206).

Thereafter, if the pre-processing on the spectral data of all the cells is completed (YES in step S206), the pre-processing/fluorescence separation unit 211 inputs the pre-processed spectral data to the clustering processing unit 214 (step S207), and ends this operation. Note that the pre-processing/fluorescence separation unit 211 may instruct the spectrum output unit 13 to present the pre-processed spectral data to a user, for example, as in step S6 of FIG. 8.

Note that in this operation, the spectral data of all the cells included in the measurement data 2 is targeted, but the target of this operation is not limited thereto, and only needs to be spectral data of the number of cells equal to or larger than the number of node divisions (hereinafter, also referred to as a necessary number) in clustering described later. The same may apply to operation of a clustering processing unit described later.

2.2.2 Operation Example of Clustering Processing Unit

Next, an operation example of the clustering processing unit 214 according to the present embodiment will be described. A basic flow of operation executed by the clustering processing unit 214 according to the present embodiment may be, for example, similar to the operation described with reference to FIG. 9 in the first embodiment. However, in the present embodiment, the clustering processing executed in step S12 of FIG. 9 is replaced with clustering processing described later with reference to FIG. 14.

Figure 14:
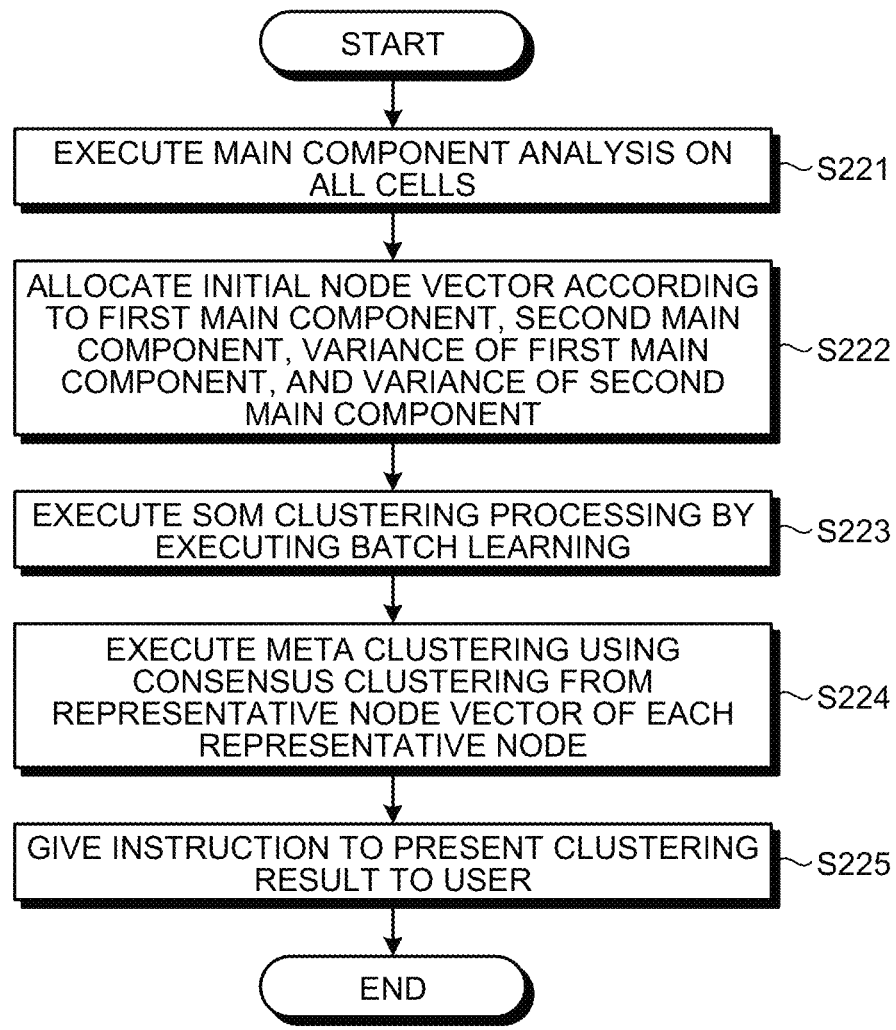
FIG. 14 is a flowchart illustrating an example of clustering processing executed by a clustering processing unit according to the second embodiment.

FIG. 14 is a flowchart illustrating an example of the clustering processing executed by the clustering processing unit according to the present embodiment. Note that, as can be seen from operation of the clustering processing unit 214 illustrated in FIG. 14, the clustering processing unit 214 according to the present embodiment can also function as one or more of a dimensional compression unit, an initial value determination unit, a clustering unit, an average value calculation unit, one or more allocation units, an update unit, a node number changing unit, a meta clustering unit, a division unit, and a node setting unit in claims.

As illustrated in FIG. 14, in the present embodiment, the clustering processing unit 214 first executes main component analysis on spectral data of all the cells (or the number of cells equal to or larger than the necessary number) included in the measurement data 2 (step S221).

Note that the spectral data targeted in step S221 may be spectral data pre-processed after fluorescence separation. In addition, in the present description, the number of main components is two, but is not limited thereto, and may be three or more. Furthermore, in step S221, not only the main component analysis but also various types of dimensional compression using a statistical data analysis method such as T-SNE may be executed.

Next, the clustering processing unit 214 determines an initial value of a representative node vector of an SOM node on the basis of a first main component and a second main component determined in step S221 and the values (vectors) of all the cells (or the number of cells equal to or larger than the necessary number) included in the measurement data 2 (step S222). Note that details of step S222 will be described later with reference to FIG. 15.

Next, the clustering processing unit 214 executes SOM clustering processing by performing batch learning (step S223). Note that details of step S223 will be described later with reference to FIG. 16.

Next, the clustering processing unit 214 executes processing of determining the number of clusters (hereinafter, referred to as meta clustering) such as consensus clustering on a result of the SOM clustering processing executed in step S223 (step S224). As a result, the number of clusters in the clustering processing is determined. Note that details of step S223 in a case of using consensus clustering will be described later with reference to FIG. 17.

Thereafter, the clustering processing unit 214 instructs the clustering result presentation unit 15 to present a clustering result to a user (step S225). For visualization for presenting the clustering result to the user, for example, a minimum spanning tree (MST) method can be used.

2.2.3 Initialization of Representative Node Vector

Figure 15:
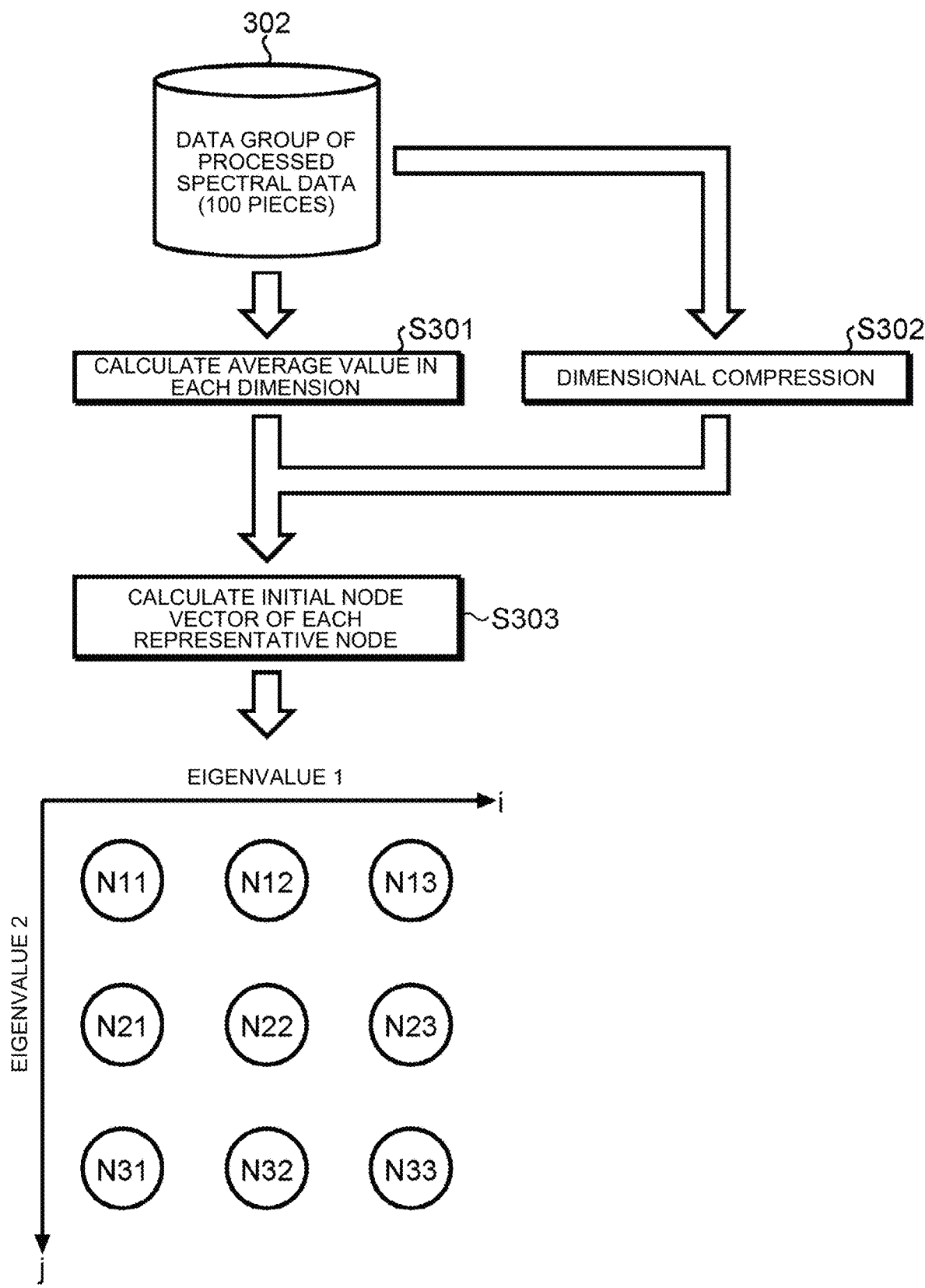
FIG. 15 is a diagram for explaining operation at the time of initializing a representative node vector of each representative node according to the present embodiment, described in step S222 of FIG. 14.

FIG. 15 is a diagram for explaining operation at the time of initializing a representative node vector of each representative node according to the present embodiment, described in step S222 of FIG. 14. Note that the example illustrated in FIG. 15 illustrates a case where 100 pieces of processed spectral data (vectors (coordinate values)) on which the pre-processing/fluorescence separation unit 211 has executed fluorescence separation and pre-processing are classified into nine representative nodes N11 to N33 arranged in three rows and three columns in a two-dimensional coordinate system in an initial state, similarly to the example illustrated in FIG. 11.

As illustrated in FIG. 15, in initialization of a representative node vector according to the present embodiment, first, the clustering processing unit 214 calculates an average value in each dimension for a data group including spectral data after fluorescence separation and pre-processing (hereinafter, referred to as processed spectral data) (hereinafter, simply referred to as a data group) 302 (step S301). For example, in a case where the number of dimensions of data is ten, for each of one to ten dimensions, values in the dimensions in all pieces of the processed spectral data included in the data group 302 are summed, and an average thereof is calculated. Note that the number of dimensions is a value corresponding to the number of types of data, and can correspond to the number of channels in a case of spectral data, for example. Therefore, for example, in a case where a light receiving element array has 32 channels, that is, a light receiving element array detects fluorescence by dividing an entire detection range into 32 wavelength bands, the number of dimensions of spectral data acquired by the light receiving element array is 32.

Subsequently, the clustering processing unit 214 performs dimensional compression on all pieces of the processed spectral data included in the data group 302 to determine a first eigenvalue, a second eigenvalue, variance of the first eigenvalue, and variance of the second eigenvalue (step S302). For the dimensional compression of data, for example, a statistical data analysis method such as main component analysis can be used. Note that the first eigenvalue and the second eigenvalue may be selected according to a predetermined rule or arbitrarily from a dimension after the dimensional compression, and the number of the eigenvalues is not limited to two of the first eigenvalue and the second eigenvalue, and may be one or three or more, for example.

Subsequently, the clustering processing unit 214 calculates an initial node vector of each of the representative nodes N11 to N33 using the following formula (3) (step S303). Note that, in formula (3), an initial value (initial node vector) of a representative node vector of a representative node Nij having coordinates (i, j) is represented by N_ij. In formula (3), the number of row divisions is the number of representative nodes arranged in a row direction, and is three in this example. Similarly, the number of column divisions is the number of representative nodes arranged in a column direction, and is three in this example.

Initial node vector $N\_ij$=average value in each dimension+(first eigenvalue/number of row divisions)×$i$+(second eigenvalue/number of column divisions)×$j$ (3)

By determining the initial node vector (initial value) of each representative node as described above, it is possible to set the same initial node vector all the time for the data group 302 having the same population. As a result, it is possible to avoid that a clustering result varies depending on execution (corresponding to the first problem described above).

2.2.4 Clustering by Batch Learning

Figure 16:
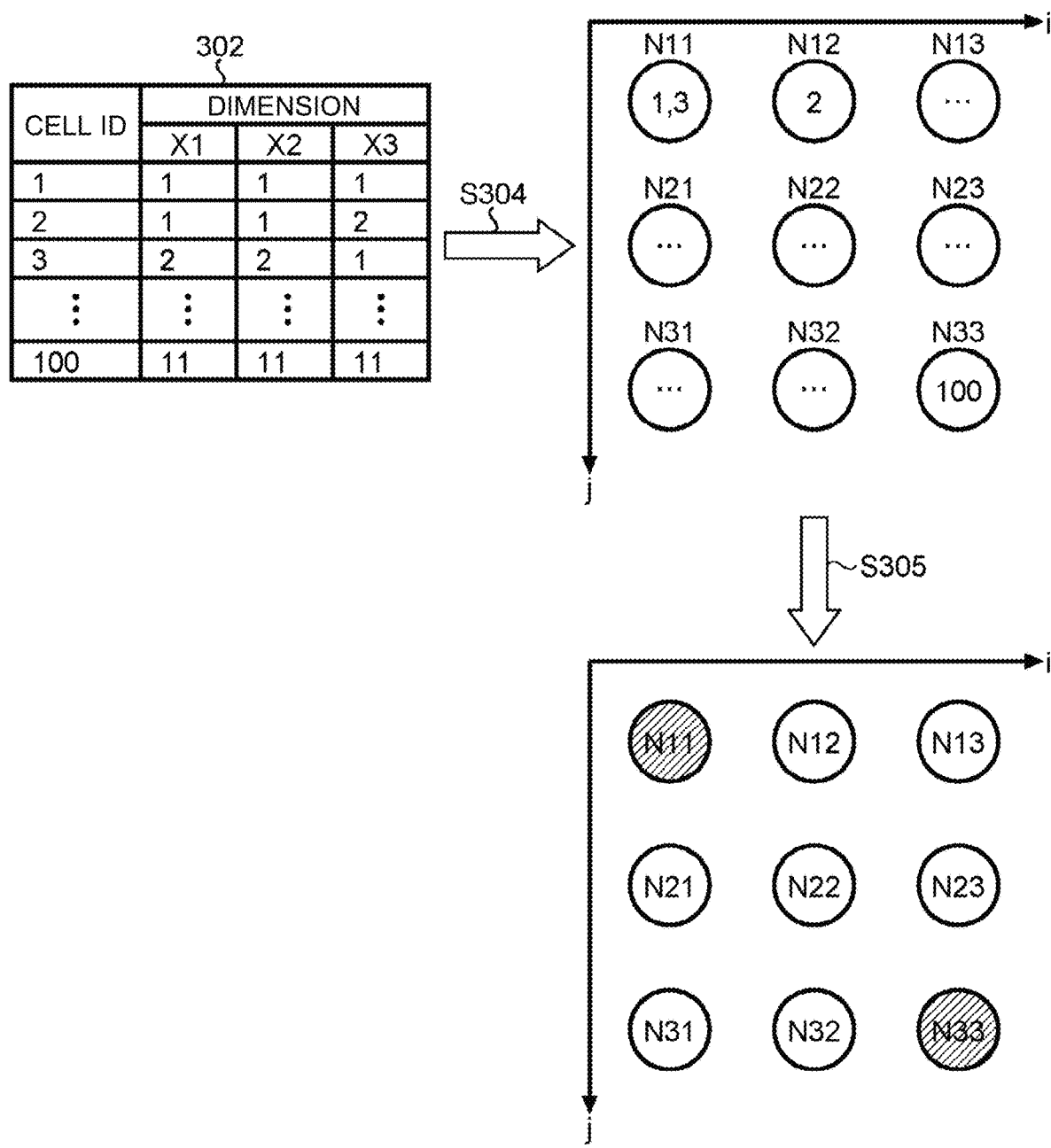
FIG. 16 is a flowchart illustrating an example of clustering by batch learning according to the present embodiment, described in step S223 of FIG. 14.

FIG. 16 is a flowchart illustrating an example of clustering by batch learning according to the present embodiment described in step S223 of FIG. 14. Note that the example illustrated in FIG. 16 illustrates a case where 100 pieces of processed spectral data (vectors (coordinate values)) on which the pre-processing/fluorescence separation unit 211 has executed fluorescence separation and pre-processing are classified into nine representative nodes N11 to N33 arranged in three rows and three columns in a two-dimensional coordinate system in an initial state, similarly to the example illustrated in FIG. 15.

As illustrated in FIG. 16, in clustering by batch learning according to the present embodiment, first, the clustering processing unit 214 executes processing of selecting processed spectral data piece by piece from the data group 302 and allocating the selected piece of processed spectral data to a representative node closest thereto (step S304). This allocation processing is repeated until allocation of all pieces (or the number of pieces equal to or larger than the necessary number) of processed spectral data in the data group 302 is completed. In the example illustrated in FIG. 16, the pieces of processed spectral data with cell IDs '1' and '3' are allocated to a representative node N11, the piece of processed spectral data with a cell ID '2' is allocated to a representative node N12, and the piece of processed spectral data with a cell ID '100' is allocated to a representative node N33 (cell IDs='4' to '99' are not described).

Note that the cell ID may be an identifier for uniquely identifying a cell corresponding to the processed spectral data registered in the data group 302. In addition, the order in selecting the processed spectral data from the data group 302 is not particularly limited, and may be, for example, various orders such as ascending order of cell IDs for uniquely identifying cells of the processed spectral data registered in the data group 302 and registration order in the data group 302.

Next, the clustering processing unit 214 executes processing of updating the representative node vector of each of the representative nodes N11 to N33 on the basis of the processed spectral data allocated to each of the representative nodes N11 to N33 (step S305). In the update of the representative node vector, for example, a new representative node vector after the update is calculated on the basis of the following formula (4).

new representative node vector $N\_ij$=(1−α)×old representative node vector $N\_ij$+α×average value of allocated processed spectral data (4)

Next, the clustering processing unit 214 executes processing of further multiplying the change by the formula (4) by β, represented by the following formula (5), on the peripheral representative node located around the representative node having the representative node vector N_ij updated in step S305, and thereby updates the peripheral representative node vector N_ij of the peripheral representative node (step S306). Note that in formula (5), β(r) may be similar to β(r) in formula (2) described above.

new peripheral representative node vector $N\_ij$=(1−β($r$))×old peripheral representative node vector $N\_ij$+β($r$)×average value of processed spectral data allocated to representative node (5)

In the present embodiment, the representative node vector of each of the representative nodes N11 to N33 is updated by repeating the processing in steps S304 to S306 described above a predetermined number of times (for example, one or more times). Note that in the repetition of the processing in steps S304 to S306, the learning ratio α and/or β may change (for example, decrease or increase) every time the processing is repeated.

As described above, by allocating all pieces of the processed spectral data to be analyzed to any of the representative nodes N11 to N33, and then updating the representative node vector of each of the representative nodes N11 to N33 using the processed spectral data allocated to each of the representative nodes N11 to N33, random sampling at the time of learning can be eliminated. Therefore, it is possible to avoid that a clustering result varies depending on execution (corresponding to the second problem).

In addition, since the update of the representative node vector is executed after the allocation of all pieces of the processed spectral data is completed, processing from the allocation of the processed spectral data to the update of the representative node vector can be subdivided and executed by different information processing devices.

For example, the processed spectral data included in the data group 302 can be divided into a plurality of groups, and the spectral data belonging to each group can be allocated to the representative node by different information processing devices. For example, the clustering processing unit 214 according to the present embodiment includes an allocation unit that allocates the plurality of pieces of processed spectral data to any of the representative nodes N11 to N33, the number of allocation units included in the clustering processing unit 214 may be equal to or less than the number of groups, and the allocation units may be executed in different information processing devices.

As a result, since the processing of allocating the processed spectral data can be executed in parallel, it is possible to improve processing efficiency, processing speed, and the like.

In addition, since it is possible to reduce the amount of data of which each information processing device is in charge by subdividing the processing, it is also possible to suppress occurrence of a problem such as an increase in processing time or a curse of dimensions at the time of clustering.

2.2.5 Determination of the Number of Clusters Using Consensus Clustering

FIG. 17 is a diagram for explaining operation for determining the number of clusters using consensus clustering described in step S224 of FIG. 14. Note that the example illustrated in FIG. 17 illustrates a case where 100 pieces of processed spectral data (vectors (coordinate values)) on which the pre-processing/fluorescence separation unit 211 has executed fluorescence separation and pre-processing are classified into nine representative nodes N11 to N33 arranged in three rows and three columns in a two-dimensional coordinate system in an initial state, similarly to the examples illustrated in FIGS. 15 and 16.

In the above description, as illustrated in (a) of FIG. 17, the case where the number of classification groups of the processed spectral data included in the data group 302, that is, the number of representative nodes is set to nine in initial setting has been exemplified. However, the number (nine) of the initially set representative nodes is not necessarily optimal depending on the processed spectral data included in the data group 302.

Therefore, in the present embodiment, in step S224 of FIG. 14, by executing meta clustering such as consensus clustering, a more suitable number of divisions and a combination of representative nodes constituting a representative node after meta clustering (hereinafter, referred to as a meta representative node) are determined as illustrated in (b) of FIG. 17.

The example illustrated in FIG. 17 exemplifies a case where, as a result of meta clustering, one meta representative node NN1 is constituted by representative nodes N11, N12, and N21, one meta representative node NN2 is constituted by representative nodes N22, N31, and N32, and one meta representative node NN3 is constituted by representative nodes N13, N23, and N33.

Note that, in the present embodiment, the number of node divisions (nine in this example) set at the time of execution of clustering may be the number of divisions determined by default or the number of divisions set by a user. In a case where a user is caused to set the initial number of node divisions, the information processing device 201 may further include an operation input unit that functions as a node setting unit that causes a user to set the number of node divisions.

2.3 Action and Effect

As described above, according to the present embodiment, since the initial node vector (initial value) of each representative node is determined on the basis of an average value of the processed spectral data for each dimension and an eigenvalue obtained by dimensional compression of the processed spectral data, it is possible to set the same initial node vector all the time for the data group 302 having the same population. As a result, it is possible to avoid that a clustering result varies depending on execution.

In addition, according to the present embodiment, by allocating all pieces of the processed spectral data to be analyzed to any of the representative nodes N11 to N33, and then updating the representative node vector of each of the representative nodes N11 to N33 using the processed spectral data allocated to each of the representative nodes N11 to N33, it is possible to avoid that a clustering result varies depending on execution.

Furthermore, in the present embodiment, since the update of the representative node vector is executed after the allocation of all pieces of the processed spectral data is completed, processing from the allocation of the processed spectral data to the update of the representative node vector can be subdivided and executed by different information processing devices.

Furthermore, since it is possible to reduce the amount of data of which each information processing device is in charge by subdividing the processing, it is also possible to suppress occurrence of a problem such as an increase in processing time or a curse of dimensions at the time of clustering.

Note that in the present embodiment, the case where the spectral data after fluorescence separation is subjected to clustering by the clustering processing unit 214 has been exemplified, but the clustering target is not limited thereto, and for example, the measurement data 2 acquired by the measurement device 3 may be subjected to clustering by the clustering processing unit 214. In this case, the pre-processing/fluorescence separation unit 211 executes pre-processing on the measurement data 2, and inputs spectral data before fluorescence separation obtained by the pre-processing to the clustering processing unit 214. Then, the clustering processing unit 214 executes the above-described clustering processing on the input spectral data before fluorescence separation.

In addition, in the present embodiment, the case where the pre-processing/fluorescence separation unit 211 executes pre-processing on a fluorescence spectrum for each fluorescent dye obtained by executing fluorescence separation processing on spectral data included in the measurement data 2 has been exemplified, but the operation of the pre-processing/fluorescence separation unit 211 is not limited thereto, and for example, the pre-processing/fluorescence separation unit 211 may execute pre-processing on spectral data included in the measurement data 2 first, and then may execute fluorescence separation processing.

Other configurations, operations, and effects may be similar to those of the above-described first embodiment, and therefore detailed description thereof is omitted here.

3. Hardware Configuration of Information Processing Device

Figure 18:
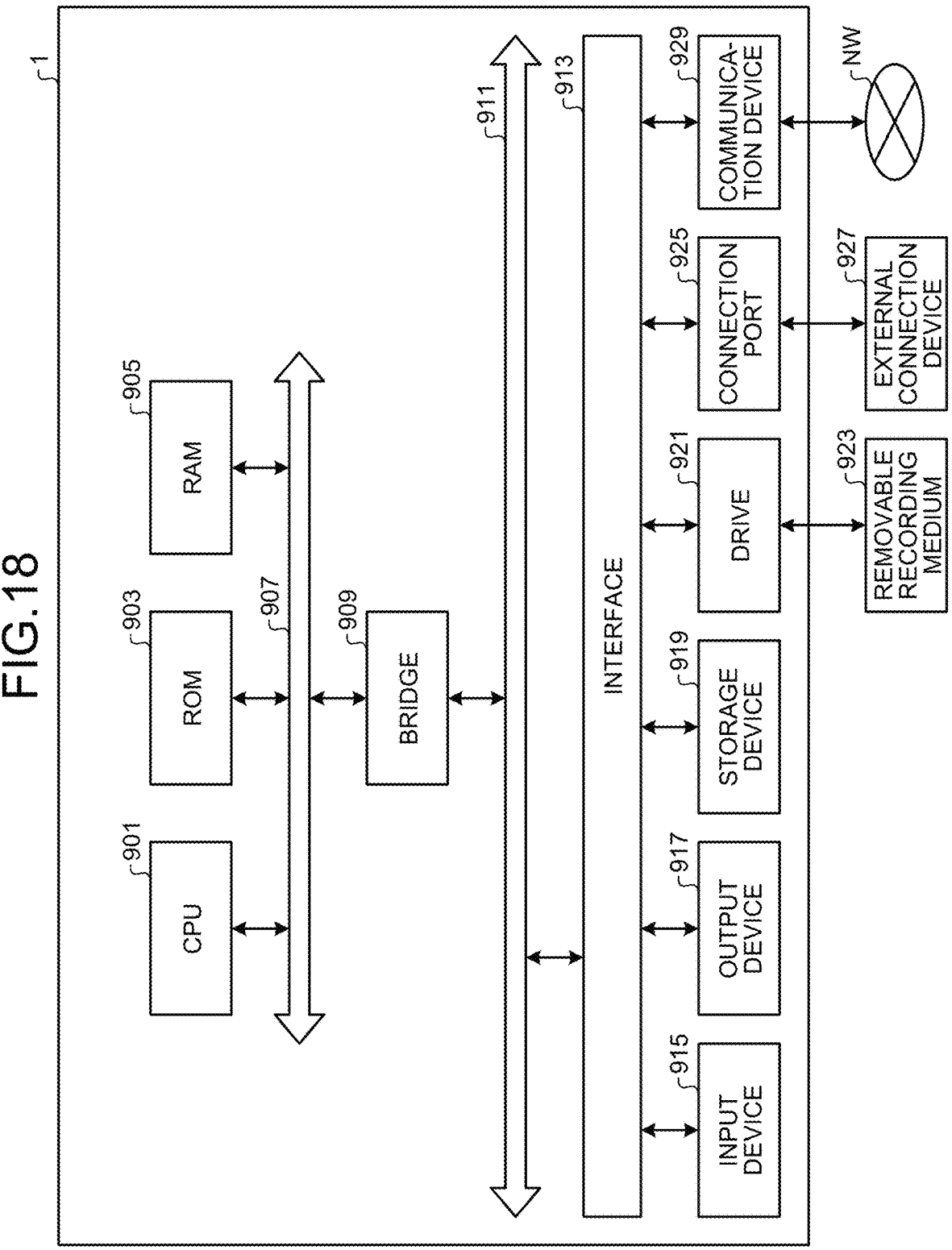
FIG. 18 is a block diagram illustrating a hardware configuration example of an information processing device.

Next, a hardware configuration of the information processing devices 1 and 201 according to the above-described embodiments will be described with reference to FIG. 18. FIG. 18 is a block diagram illustrating a hardware configuration example of the information processing devices according to the embodiments of the present disclosure. Note that, in the following description, the information processing device 1 will be exemplified, but the same applies also to the information processing device 201 similarly.

As illustrated in FIG. 18, the information processing device 1 includes a central processing unit (CPU) 901, a read only memory (ROM) 903, and a random access memory (RAM) 905. In addition, the information processing device 1 includes a host bus 907, a bridge 909, an external bus 911, an interface 913, an input device 915, an output device 917, a storage device 919, a drive 921, a connection port 925, and a communication device 929. The information processing device 1 may include a processing circuit called a digital signal processor (DSP) or an application specific integrated circuit (ASIC) instead of or in addition to the CPU 901.

The CPU 901 functions as an arithmetic processing device and a control device, and controls the overall operation or a part thereof in the information processing device 1 according to various programs recorded in the ROM 903, the RAM 905, the storage device 919, or a removable recording medium 923. For example, the CPU 901 controls the overall operation of each functional unit included in the information processing device 1 in the above embodiment. The ROM 903 stores a program, an operation parameter, and the like used by the CPU 901. The RAM 905 primarily stores a program used in execution of the CPU 901, a parameter that appropriately changes in the execution, and the like. The CPU 901, the ROM 903, and the RAM 905 are connected to each other by the host bus 907 constituted by an internal bus such as a CPU bus. Furthermore, the host bus 907 is connected to the external bus 911 such as a peripheral component interconnect/interface (PCI) bus via the bridge 909.

The input device 915 is a device operated by a user, such as a mouse, a keyboard, a touch panel, a button, a switch, or a lever. The input device 915 may be, for example, a remote control device using an infrared ray or another radio wave, or an external connection device 927 such as a mobile phone corresponding to operation of the information processing device 1. The input device 915 includes an input control circuit that generates an input signal on the basis of information input by a user and outputs the input signal to the CPU 901. By operating the input device 915, a user inputs various types of data to the information processing device 1 or instructs the information processing device 1 to perform processing operation.

The output device 917 is constituted by a device capable of visually or aurally notifying a user of acquired information. The output device 917 can be, for example, a display device such as an LCD, a PDP, or an OELD, a sound output device such as a speaker or a headphone, or a printer device. The output device 917 outputs a result obtained by processing of the information processing device 1 as a video such as a text or an image, or as a sound such as audio.

The storage device 919 is a data storage device constituted as an example of a storage of the information processing device 1. The storage device 919 is constituted by, for example, a magnetic storage device such as a hard disk drive (HDD), a semiconductor storage device, an optical storage device, or a magneto-optical storage device. The storage device 919 stores a program and various types of data executed by the CPU 901, various types of data acquired from the outside, and the like.

The drive 921 is a reader/writer for the removable recording medium 923 such as a magnetic disk, an optical disk, a magneto-optical disk, or a semiconductor memory, and is built in or externally attached to the information processing device 1. The drive 921 reads information recorded in the attached removable recording medium 923 and outputs the information to the RAM 905. In addition, the drive 921 writes a record in the attached removable recording medium 923.

The connection port 925 is a port for directly connecting a device to the information processing device 1. The connection port 925 can be, for example, a universal serial bus (USB) port, an IEEE 1394 port, or a small computer system interface (SCSI) port. In addition, the connection port 925 may be an RS-232C port, an optical audio terminal, a high-definition multimedia interface (HDMI) (registered trademark) port, or the like. By connecting the external connection device 927 to the connection port 925, various types of data can be exchanged between the information processing device 1 and the external connection device 927.

The communication device 929 is, for example, a communication interface constituted by a communication device or the like for connection to a communication network NW. The communication device 929 can be, for example, a communication card for wired or wireless local area network (LAN), Bluetooth (registered trademark), or wireless USB (WUSB). In addition, the communication device 929 may be a router for optical communication, a router for asymmetric digital subscriber line (ADSL), a modem for various types of communication, or the like. The communication device 929 transmits and receives a signal and the like to and from the Internet or another communication device using a predetermined protocol such as TCP/IP. In addition, the communication network NW connected to the communication device 929 is a network connected in a wired or wireless manner, and is, for example, the Internet, a home LAN, infrared communication, radio wave communication, or satellite communication.

Note that the technical scope of the present disclosure is not limited to the above-described embodiments as they are, and various modifications can be made without departing from the gist of the present disclosure. In addition, components of different embodiments and modifications may be appropriately combined with each other.

For example, in the above embodiments, the information processing system 4 includes the information processing device 1 or 201 and the measurement device 3, but the present technology is not limited to such an example. For example, the information processing device 1 or 201 may have a function (measurement function) of the measurement device 3. In this case, the information processing system 4 is implemented by the information processing device 1 or 201. In addition, the measurement device 3 may have the functions of the information processing device 1 or 201. In this case, the information processing system 4 is implemented by the measurement device 3. In addition, the measurement device 3 may have some of the functions of the information processing device 1 or 201, and the information processing device 1 or 201 may have some of the functions of the measurement device 3.

Note that the present technology can also have the following configurations.

(1)
An information processing device including:
a dimensional compression unit that executes dimensional compression on each of a plurality of pieces of spectral data including a fluorescent component emitted from each of a plurality of particles labeled with one or more fluorescent dyes;
an initial value determination unit that determines an initial value for each of a plurality of nodes on the basis of a result of the dimensional compression; and
a clustering unit that executes clustering on the plurality of pieces of spectral data using the initial value.

(2)
The information processing device according to (1), further including an average value calculation unit that calculates an average value of the plurality of pieces of spectral data for each dimension, in which
the initial value determination unit determines the initial value of each of the plurality of nodes on the basis of the average value of the plurality of pieces of spectral data for each dimension in addition to a result of the dimensional compression.

(3)
The information processing device according to (1) or (2), in which
the clustering unit includes:
an allocation unit that allocates each of the plurality of pieces of spectral data to any one of the plurality of nodes; and
an update unit that updates a node vector of each of the plurality of nodes on the basis of the spectral data allocated to each of the plurality of nodes.

(4)
The information processing device according to (3), in which
the clustering unit includes:
a node number changing unit that changes the number of nodes by executing consensus clustering on the node vector of each of the plurality of nodes updated by the update unit; and a meta clustering unit that executes meta clustering based on the node vector of each of the plurality of nodes before change on a node after change by the node number changing unit.

(5)

The information processing device according to (4), in which the clustering unit further includes a division unit that divides the plurality of pieces of spectral data into two or more groups, and the allocation unit allocates each of the plurality of pieces of spectral data to any one of the plurality of nodes for each of the two or more groups.

(6)

The information processing device according to (5), in which the clustering unit includes the allocation units as many as or less than the number of groups, and the allocation units are respectively arranged in different information processing devices.

(7)

The information processing device according to any one of (1) to (6), in which the clustering unit executes clustering using a self-organizing map (SOM) algorithm.

(8)

The information processing device according to any one of (1) to (7), further including a node setting unit that causes a user to set the number of nodes.

(9)

The information processing device according to any one of (1) to (8), in which the dimensional compression unit executes main component analysis on the plurality of pieces of spectral data as the dimensional compression.

(10)

The information processing device according to any one of (1) to (9), in which the spectral data is spectral data measured by a spectrum type flow cytometer.

(11)

The information processing device according to any one of (1) to (10), further including a pre-processing unit that executes scale conversion on each of the plurality of pieces of spectral data, in which the dimensional compression unit executes the dimensional compression on each of the plurality of pieces of spectral data on which the scale conversion has been executed.

(12)

The information processing device according to (11), further including a fluorescence separation unit that separates each of the plurality of pieces of spectral data into a fluorescence spectrum for each of the fluorescent dyes, in which the pre-processing unit executes the scale conversion on each of the plurality of fluorescence spectra.

(13)

The information processing device according to (11) or (12), in which the pre-processing unit performs conversion of non-linear processing as the scale conversion.

(14)

The information processing device according to (13), in which the pre-processing unit performs logicle conversion, log conversion, or bi-exponential conversion as the scale conversion.

(15)

The information processing device according to any one of (1) to (14), further including a display control unit that displays a result of the clustering performed by the clustering unit.

(16)

The information processing device according to any one of (11) to (14), further including a display control unit that displays a result of the clustering performed by the clustering unit, in which the display control unit displays data on which scale conversion has been performed by the pre-processing unit.

(17)

An information processing method including:

executing dimensional compression on each of a plurality of pieces of spectral data including a fluorescent component emitted from each of a plurality of particles labeled with one or more fluorescent dyes;

an initial value is determined for each of a plurality of nodes on the basis of a result of the dimensional compression; and executing clustering on the plurality of pieces of spectral data using the initial value.

(18)

A program for causing a computer to execute:

a step of executing dimensional compression on each of a plurality of pieces of spectral data including a fluorescent component emitted from each of a plurality of particles labeled with one or more fluorescent dyes;

a step of determining an initial value for each of a plurality of nodes on the basis of a result of the dimensional compression; and a step of executing clustering on the plurality of pieces of spectral data using the initial value.

(19)

An information processing system comprising:

a measurement device that detects each of a plurality of pieces of spectral data including a fluorescent component emitted from each of a plurality of particles labeled with one or more fluorescent dyes; and an information processing device that performs clustering on the plurality of pieces of spectral data detected by the measurement device, in which the information processing device includes:

a dimensional compression unit that executes dimensional compression on each of the plurality of pieces of spectral data detected by the measurement device;

an initial value determination unit that determines an initial value for each of a plurality of nodes on the basis of a result of the dimensional compression; and a clustering unit that executes clustering on the plurality of pieces of spectral data using the initial value.

REFERENCE SIGNS LIST 1, 201 Information Processing Device
2 Measurement Data
3 Measurement Device
4, 200 Information Processing System
11 Pre-Processing Unit 12 Pre-Processing Parameter Table
13 Spectrum Output Unit
14, 214 Clustering Processing Unit
15 Clustering Result Presentation Unit
16 Fluorescence Separation Unit
17 Normal Analysis Presentation Unit
211 Pre-Processing/Fluorescence Separation Unit
302 Data Group

The invention claimed is:

1. An information processing device comprising:
a pre-processing unit that converts actual observation values from a measurement device according to a user-selected parameter;
a spectrum output unit that generates an image of a spectrum plot on at least one display device using spectral data that has been pre-processed by the pre-processing unit;
a dimensional compression unit that executes dimensional compression on each of a plurality of pieces of spectral data including a fluorescent component emitted from each of a plurality of particles labeled with one or more fluorescent dyes,
wherein a statistical data analysis method used by the dimensional compression unit comprises t-distributed Stochastic Neighbor Embedding (T-SNE);
an initial value determination unit that determines an initial value for each of a plurality of nodes on a basis of a result of the dimensional compression;
a clustering unit that executes clustering on the plurality of pieces of spectral data using the initial value; and
a clustering result presentation unit that displays a clustering result by the clustering unit on the at least one display device.

2. The information processing device according to claim 1, further comprising
an average value calculation unit that calculates an average value of the plurality of pieces of spectral data for each dimension, wherein
the initial value determination unit determines the initial value of each of the plurality of nodes on a basis of the average value of the plurality of pieces of spectral data for each dimension in addition to a result of the dimensional compression.

3. The information processing device according to claim 1, wherein
the clustering unit includes:
an allocation unit that allocates each of the plurality of pieces of spectral data to any one of the plurality of nodes; and
an update unit that updates a node vector of each of the plurality of nodes on a basis of the spectral data allocated to each of the plurality of nodes.

4. The information processing device according to claim 3, wherein
the clustering unit includes:
a node number changing unit that changes the number of nodes by executing consensus clustering on the node vector of each of the plurality of nodes updated by the update unit; and
a meta clustering unit that executes meta clustering based on the node vector of each of the plurality of nodes before change on a node after change by the node number changing unit.

5. The information processing device according to claim 4, wherein
the clustering unit further includes a division unit that divides the plurality of pieces of spectral data into two or more groups, and
the allocation unit allocates each of the plurality of pieces of spectral data to any one of the plurality of nodes for each of the two or more groups.

6. The information processing device according to claim 5, wherein
the clustering unit includes the allocation units as many as or less than the number of groups, and
the allocation units are respectively arranged in different information processing devices.

7. The information processing device according to claim 1, wherein
the clustering unit executes clustering using a self-organizing map (SOM) algorithm.

8. The information processing device according to claim 1, further comprising
a node setting unit that causes a user to set the number of nodes.

9. The information processing device according to claim 1, wherein
the dimensional compression unit executes main component analysis on the plurality of pieces of spectral data as the dimensional compression.

10. The information processing device according to claim 1, wherein
the spectral data is spectral data measured by a spectrum type flow cytometer.

11. The information processing device according to claim 1, further comprising
a pre-processing unit that executes scale conversion on each of the plurality of pieces of spectral data, wherein
the dimensional compression unit executes the dimensional compression on each of the plurality of pieces of spectral data on which the scale conversion has been executed.

12. The information processing device according to claim 11, further comprising
a fluorescence separation unit that separates each of the plurality of pieces of spectral data into a fluorescence spectrum for each of the fluorescent dyes, wherein
the pre-processing unit executes the scale conversion on each of the plurality of fluorescence spectra.

13. The information processing device according to claim 11, wherein
the pre-processing unit performs conversion of non-linear processing as the scale conversion.

14. The information processing device according to claim 13, wherein
the pre-processing unit performs logicle conversion, log conversion, or bi-exponential conversion as the scale conversion.

15. The information processing device according to claim 11, further comprising
a display control unit that displays a result of the clustering performed by the clustering unit, wherein
the display control unit displays data on which scale conversion has been performed by the pre-processing unit.

16. The information processing device according to claim 1, further comprising
a display control unit that displays a result of the clustering performed by the clustering unit.

17. An information processing method comprising:
converting actual observation values from a measurement device according to a user-selected parameter;

generating an image of a spectrum plot on at least one display device using spectral data that has been pre-processed by a pre-processing unit;

executing dimensional compression on each of a plurality of pieces of spectral data including a fluorescent component emitted from each of a plurality of particles labeled with one or more fluorescent dyes, wherein a statistical data analysis method used the dimensional compression unit comprises t-distributed Stochastic Neighbor Embedding (T-SNE);

determining an initial value for each of a plurality of nodes on a basis of a result of the dimensional compression;

executing clustering on the plurality of pieces of spectral data using the initial value; and displaying a clustering result by the clustering unit on the at least one display device.

18. A non-transitory computer readable medium storing instructions that, when executed by a computer, cause the computer to execute the processes of:

converting actual observation values from a measurement device according to a user-selected parameter;

generating an image of a spectrum plot on at least one display device using spectral data that has been pre-processed by a pre-processing unit;

executing dimensional compression on each of a plurality of pieces of spectral data including a fluorescent component emitted from each of a plurality of particles labeled with one or more fluorescent dyes, wherein a statistical data analysis method used the dimensional compression unit comprises t-distributed Stochastic Neighbor Embedding (T-SNE);

determining an initial value for each of a plurality of nodes on a basis of a result of the dimensional compression; and executing clustering on the plurality of pieces of spectral data using the initial value; and displaying a clustering result by the clustering unit on the at least one display device.

19. An information processing system comprising:

a measurement device that detects a plurality of pieces of spectral data including a fluorescent component emitted from each of a plurality of particles labeled with one or more fluorescent dyes; and an information processing device that performs clustering on the plurality of pieces of spectral data detected by the measurement device, wherein the information processing device includes:

a pre-processing unit that converts actual observation values from the measurement device according to a user-selected parameter;

a spectrum output unit that generates an image of a spectrum plot on at least one display device using spectral data that has been pre-processed by the pre-processing unit;

a dimensional compression unit that executes dimensional compression on each of the plurality of pieces of spectral data detected by the measurement device, wherein a statistical data analysis method used by the dimensional compression unit comprises t-distributed Stochastic Neighbor Embedding (T-SNE);

an initial value determination unit that determines an initial value for each of a plurality of nodes on a basis of a result of the dimensional compression;

a clustering unit that executes clustering on the plurality of pieces of spectral data using the initial value; and a clustering result presentation unit that displays a clustering result by the clustering unit on the at least one display device.

* * * * *